United States Patent [19]
Sawasaki et al.

[11] Patent Number: 5,144,864
[45] Date of Patent: Sep. 8, 1992

[54] HYDRAULIC CONTROL APPARATUS FOR HYDRAULIC TRANSMISSION

[75] Inventors: Tomoo Sawasaki, Higashihiroshima; Chitoshi Morishige, Hiroshima, both of Japan

[73] Assignee: Mazda Motor Corporation, Hiroshima, Japan

[21] Appl. No.: 714,721

[22] Filed: Jun. 13, 1991

[30] Foreign Application Priority Data
Jun. 15, 1990 [JP] Japan .................................. 2-155453

[51] Int. Cl.⁵ .............................................. B60K 41/16
[52] U.S. Cl. .................................. 74/866; 74/867; 74/864; 192/76
[58] Field of Search ..................... 74/866, 867, 864; 192/76

[56] References Cited

U.S. PATENT DOCUMENTS

| | | | |
|---|---|---|---|
| 4,648,496 | 3/1987 | Petzold et al. | 192/76 O |
| 4,718,012 | 1/1988 | Oshiage | 74/866 X |
| 4,735,113 | 4/1988 | Kamamuro et al. | 74/867 X |
| 4,829,433 | 5/1989 | Nakano et al. | 74/866 X |
| 4,846,019 | 7/1989 | Kumura | 74/864 O |
| 4,893,526 | 1/1990 | Tokoro | 74/866 O |
| 4,916,982 | 4/1990 | Suzuki | 74/866 O |

*Primary Examiner*—Rodney H. Bonck
*Assistant Examiner*—Daniel Wittels

[57] ABSTRACT

A hydraulic control apparatus for a transmission performs hydraulic control for the pressure controlling valves by conducting a feedback pressure control on one pressure controlling valve provided in the transmission on the basis of the output of a hydraulic sensor and by performing feedforward control on the other pressure controlling valve in the transmission utilizing the results of the feedback control.

6 Claims, 18 Drawing Sheets

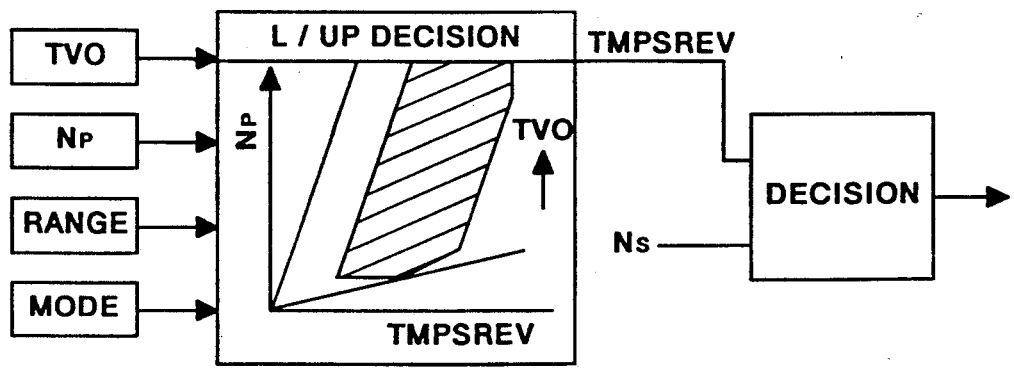
F I G. 5A
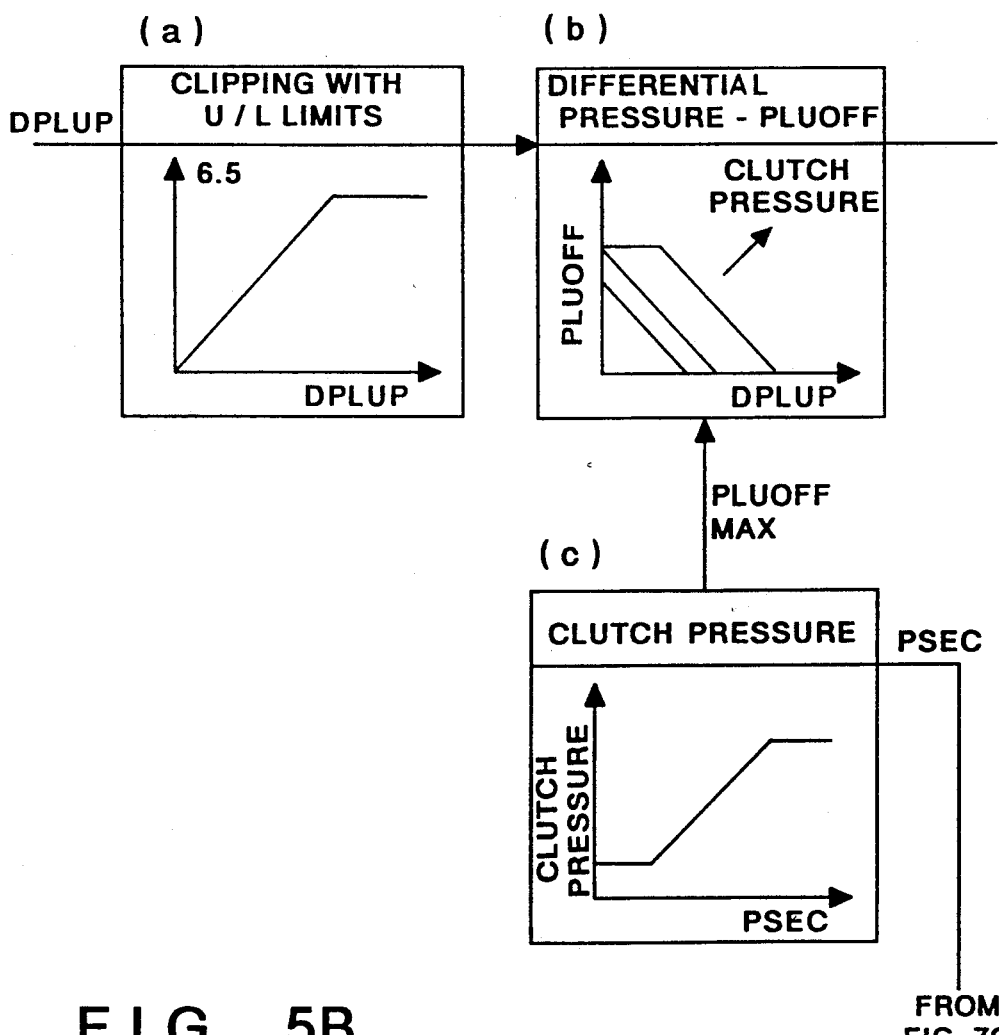
F I G. 5B

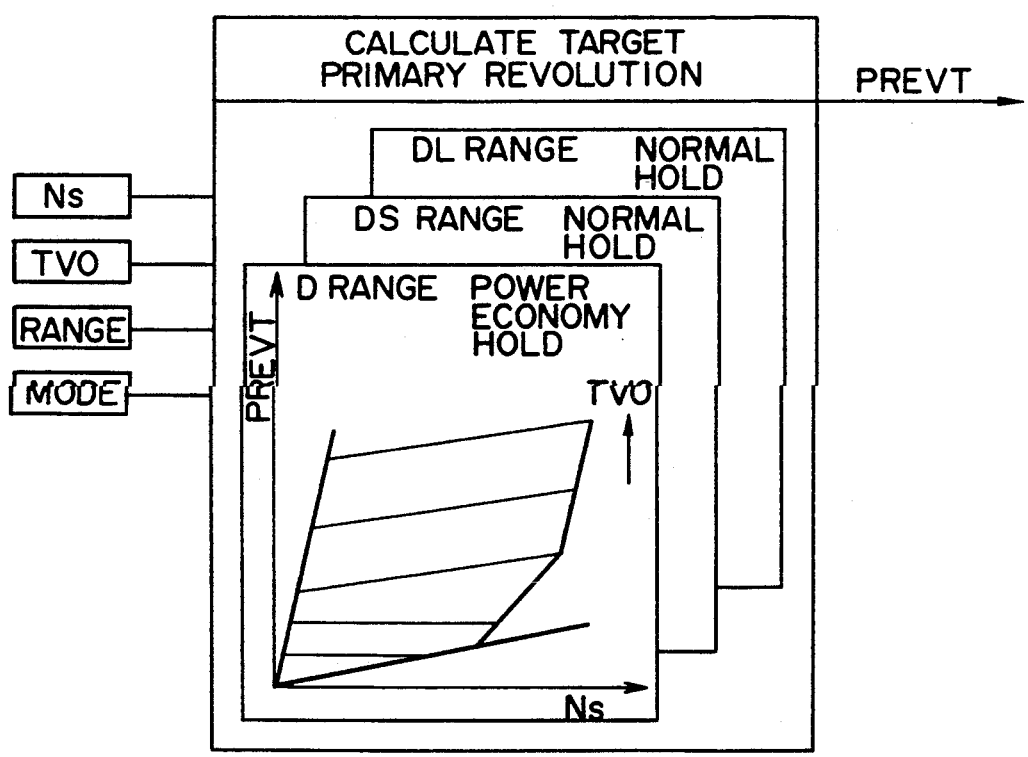
F I G. 6

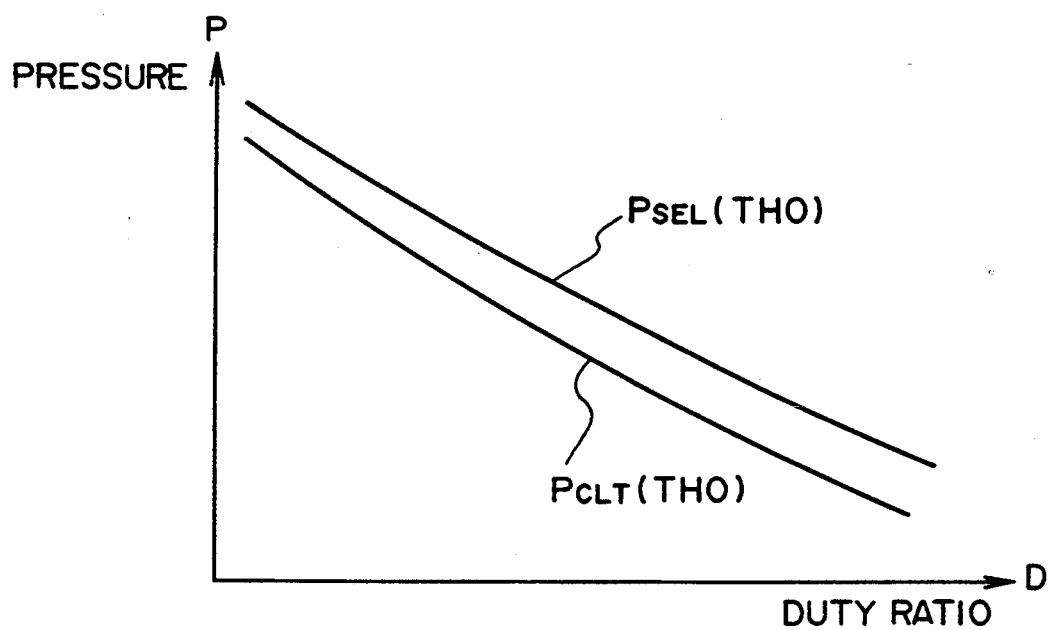
F I G. 11

HYDRAULIC CONTROL APPARATUS FOR HYDRAULIC TRANSMISSION

BACKGROUND OF THE INVENTION

The present invention relates to a hydraulic control apparatus for use in a hydraulically actuated transmission, such as a stepless transmission for vehicles. More particularly, the present invention is directed to a reduction in the number of, for example, hydraulic sensors which is achieved by conducting a feedback pressure control on part of a plurality of pressure controlling valves for adjusting the oil pressure in a hydraulic circuit for a transmission to a predetermined value and by conducting a feedforward pressure control on the other pressure controlling valves.

Japanese Patent Application Laid open (Kokai) No. 2-3751 discloses a speed-change control apparatus for use in a V-belt type stepless transmission for vehicles which is a hydraulic control apparatus for a hydraulically actuated transmission designed to transmit the output of an engine obtained through a fluid coupling to the wheels at a predetermined speed reduction rate. In this hydraulic control apparatus, in order to increase the durability of the belt and thereby stabilize the torque transmission, servo control is conducted on a force applied to the V belt, i.e., an oil pressure to be applied to the input side pulley (primary pulley) and an oil pressure to be applied to the output side pulley (secondary pulley) in accordance with the output of the engine and the torque ratio of the two pulleys. In the stepless transmission, the life time of the V-belt is the important factor, and this servo control conducted on the oil pressures can achieve an increase in the durability of the belt and stabilization of the torque transmission.

In a transmission, such as a stepless transmission, which requires the aforementioned accurate hydraulic control, feedback control is conducted on the line pressure using a hydraulic sensor. Therefore, in the case of a hydraulic circuit having a plurality of oil pressure controlling valves, a hydraulic sensor is provided for each of the oil pressure controlling valves, and feedback control is performed separately for each valve using the sensor output.

However, such a hydraulic sensor is expensive, and hinders cost reduction.

SUMMARY OF THE INVENTION

In view of the aforementioned problems of the conventional techniques, an object of the present invention is to provide a hydraulic control apparatus for a hydraulically actuated transmission which is capable of performing accurate hydraulic control on a hydraulic pressure controlling valve having no hydraulic sensor even when the number of hydraulic sensors is reduced.

When a plurality of hydraulic pressure controlling valves are provided in a transmission, the results of the feedback control performed on the respective hydraulic pressure controlling valves using the output of the hydraulic sensors respectively provided for the hydraulic pressure controlling valves have the same tendency.

This invention is based on this knowledge, and is designed such that hydraulic control for one hydraulic pressure controlling valve is conducted by performing feedback control on that hydraulic pressure controlling valve on the basis of the output of the hydraulic sensor while hydraulic control for the other hydraulic pressure controlling valve(s) is conducted by performing feedforward control on that hydraulic pressure controlling valve utilizing the results of the feedback control.

That is, the present invention provides a hydraulic control apparatus for a transmission having at least two hydraulic pressure controlling valves for adjusting the hydraulic pressure, which comprises:

a hydraulic sensor means for monitoring a hydraulic pressure;

a feedback control means for feedback controlling a hydraulic pressure of a first hydraulic pressure controlling valve on the basis of an output of the sensor means; and a feedforward control means for feedforward controlling a hydraulic pressure of a second hydraulic pressure controlling valve on the basis of the results of the feedback control.

In a case where a plurality of hydraulic pressure controlling valves are provided in a transmission, if feedback control is performed on one hydraulic pressure controlling valve while feedforward control is performed on the second valve, the results of the two controls have the same tendency in terms of the hydraulic temperature. Hence, another object of the present invention is to provide a control apparatus in which the hydraulic control accuracy in the feedforward control is further improved by determining the control variable in the feedback control utilizing the detected hydraulic temperature.

In a preferred embodiment of the present invention, when the transmission is a belt type stepless transmission including a hydraulically actuated clutch mechanism for transmitting the rotation of an engine in forward and reverse directions, and a belt power transmission mechanism having primary and secondary pulleys whose diameters are controlled using hydraulic pressure, the first hydraulic pressure controlling valve controls the line pressure for the secondary pulley, and the second hydraulic pressure controlling valve controls the hydraulic pressure for the clutch mechanism.

In one preferred embodiment of the present invention, the hydraulic inputs to the first and second hydraulic pressure controlling valves are supplied from a common source. When the present invention is applied to such a transmission, it is possible to assure a high degree of hydraulic control accuracy in the feedforward control.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such an example, however, is not exhaustive of the various embodiments of the invention, and therefore reference is made to the claims which follow the description for determining the scope of the invention.

BRIEF DESCRIPTION OF THE DRAWING

FIG. 5A is a schematic diagram illustrating the characteristics for determining the control range in a lockup operation;

FIG. 5B is a schematic diagram illustrating a control for calculating the duty of a solenoid for a lockup clutch;

FIG. 6 is a schematic diagram illustrating a control for calculating the target revolution of a primary pulley;

FIG. 7C is a schematic diagram illustrating a control for performing a centrifugal force correction or the like;

FIG. 11 is a graph which the operation for converting target pressure into a duty ratio;

DESCRIPTION OF THE PREFERRED EMBODIMENT

An embodiment of a control apparatus for a stepless transmission according to the present invention will now be described in detail.

STRUCTURE OF TRANSMISSION

Figure 1A:
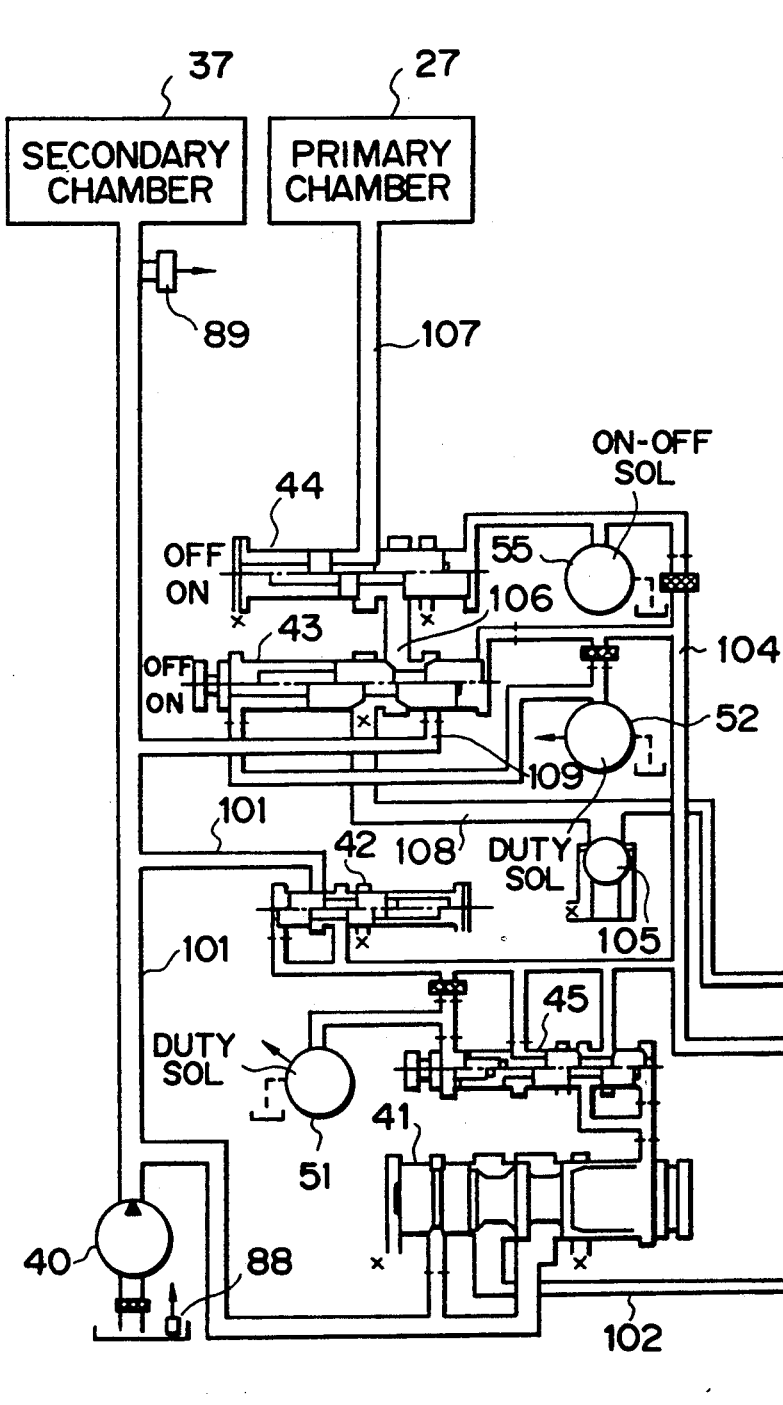
FIGS. 1A and 1B are circuit diagrams which illustrate the structure of a hydraulic circuit connected to a stepless transmission of an embodiment according to the present invention.
Figure 1B:
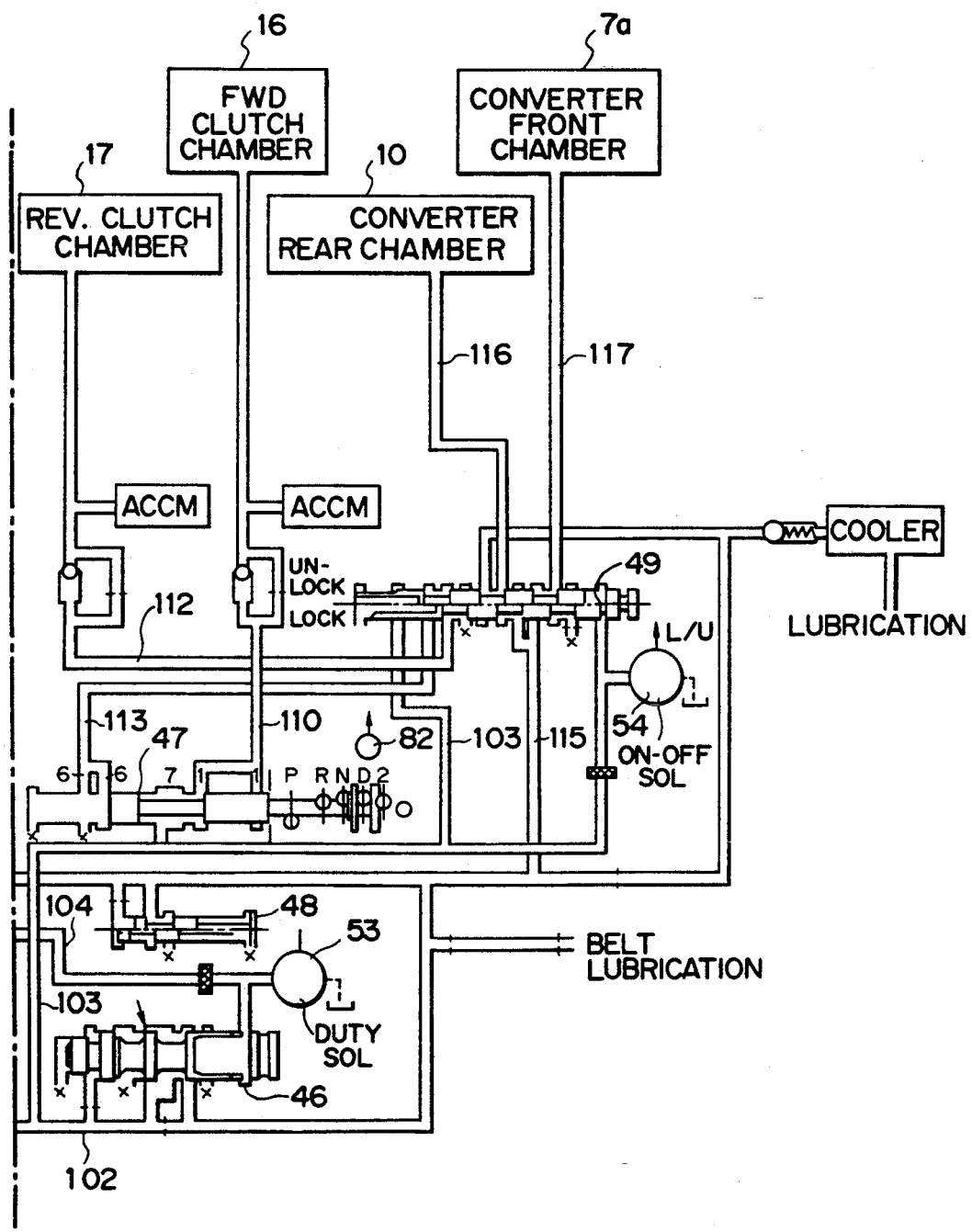
Figure 2:
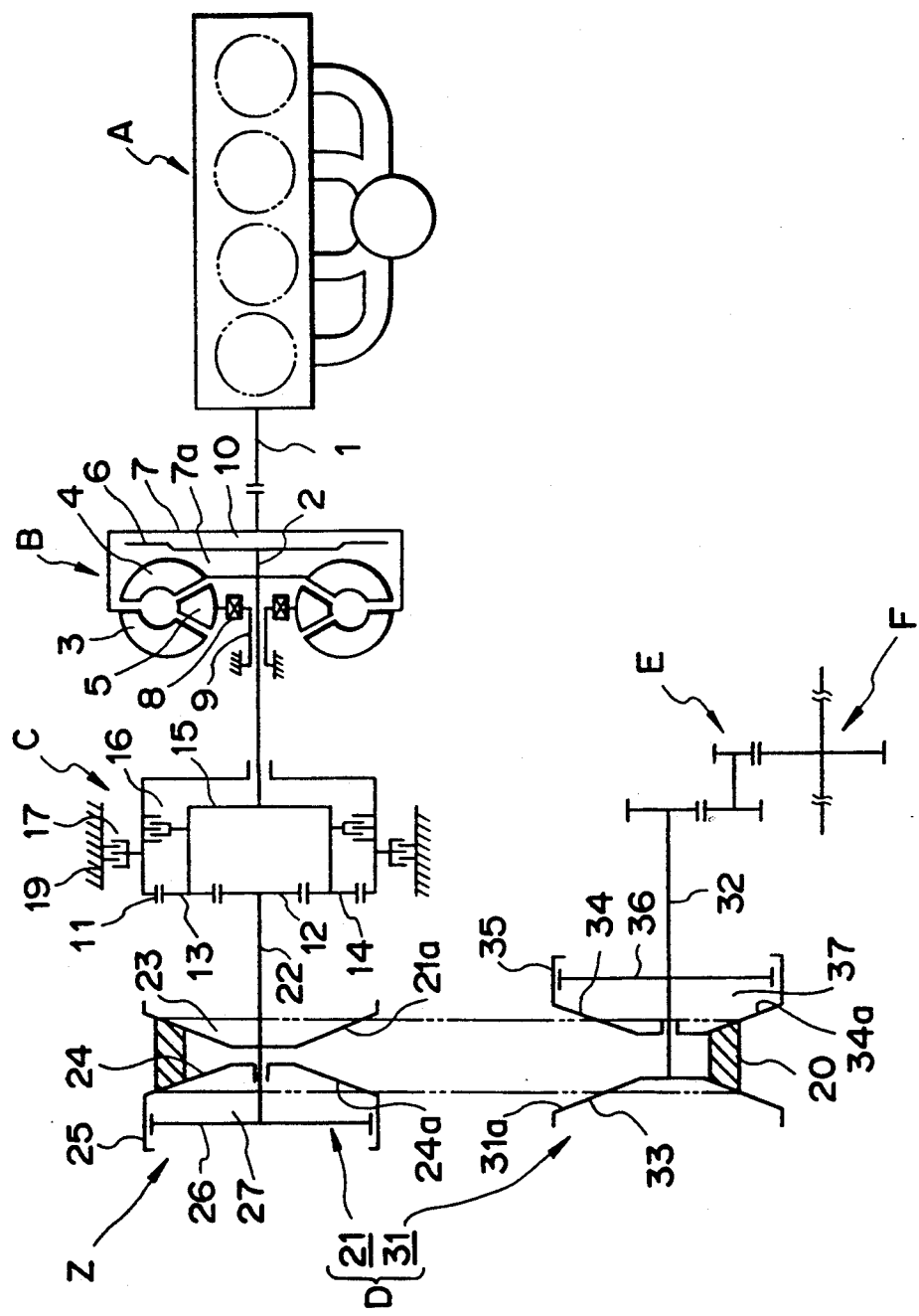
FIG. 2 is a schematic view drawing which schematically illustrates the structure of the stepless transmission to which the hydraulic differential type transmission is applied.

FIG. 2 is a schematic drawing which illustrates the overall structure of a stepless transmission Z. FIG. 1 illustrates a hydraulic circuit Q for the stepless transmission Z shown in FIG. 2.

First, the overall structure of the stepless transmission Z will be briefly described with reference to FIG. 1. Then, the structure of the hydraulic circuit Q having a line pressure control apparatus which is an essential portion of the present invention will be described with reference to FIG. 2.

Overall Structure of Stepless Transmission Z

The stepless transmission Z serves as the stepless transmission for a front wheel drive vehicle basically comprising a torque converter B connected to an output shaft 1 of an engine A, a forward/reverse switch mechanism C, a belt transmission mechanism D, a reduction mechanism E and a differential mechanism F.

Torque Converter B

The torque converter B comprises a pump impeller 3 secured to an end portion of a pump cover 7 connected to the engine output shaft 1, the pump impeller 3 being arranged to integrally rotate with the engine output shaft 1. The torque converter B further comprises a turbine runner 4 rotatably disposed in a converter front chamber 7a formed inside of the pump cover 7, the turbine runner 4 being disposed to confront the pump impeller 3. The torque converter B further comprises a stator 5 disposed between the pump impeller 3 and the turbine runner 4 so as to increase the torque. The turbine runner 4 is connected to a carrier 15 which is an input member of a forward/reverse switch mechanism C to be described later, the turbine runner 4 being connected as described above via a turbine shaft 2. The stator 5 is connected to a mission case via a one-way clutch 8 and a stator shaft 9.

Furthermore, a lockup piston 6 is disposed between the turbine runner 4 and the pump cover 7, the lockup piston 6 being fastened to the turbine shaft 2 so as to slide as desired. As a result of this, the lockup piston 6 comes in contact with the pump cover 7 when oil pressure is introduced or discharged from the converter front chamber 7a and the converter rear chamber 10. Therefore, a lockup state in which the lockup piston 6 is integrated with the pump cover 7 and a converter state in which the same is moved away from the pump cover 7 can be selected. In the thus selected lockup state, the engine output shaft 1 and the turbine shaft 2 are directly connected to each other while placing no fluid therebetween. In the converter state, the engine torque is transmitted to the turbine shaft 2 via the fluid.

Forward/Reverse Switch Mechanism C

The forward/reverse switch mechanism C is arranged to Q selectively set a forward mode in which the rotation of the turbine shaft 2 of the torque converter B is, as it is, transmitted to a belt transmission mechanism D to be described later and a reverse mode in which the same is transmitted to the belt transmission mechanism D in a reversed manner. According to the embodiment, the forward/reverse mechanism C comprises a double-pinion type planetary gear unit. That is, a first pinion gear 13 to be engaged to a sun gear 12 and a second pinion gear 14 to be engaged to a ring gear 11 are fastened to a carrier 15 connected, in a spline manner, to the turbine shaft 2. The sun gear 12 is connected, in a spline manner, to a primary shaft 22 of a belt transmission mechanism D to be described later.

Furthermore, an FWD clutch 16 for connecting/disconnecting the ring gear 11 and the carrier 15 is disposed between the ring gear 11 and the carrier 15. In addition, a REV clutch 17 for fixing the ring gear 11 to a mission case 19 is disposed between the ring gear 11 and the mission case 19.

Therefore, when the FWD clutch 16 is connected and the REV clutch 17 is disconnected, the ring gear 11 and the carrier are integrated with each other. Furthermore, the ring gear 11 is enabled to rotate relative to the mission case 19. Therefore, the rotation of the turbine shaft 2 is transmitted from the sun gear 12 toward the primary shaft 22 while maintaining the present rotational direction (the forward mode).

On the other hand, when the FWD clutch 16 is disconnected and the REV clutch 17 is connected, the ring gear 11 is secured to the mission case 19 and the ring gear 11 and the carrier 15 are brought into a state in which they can rotate relative to one another. Therefore, the rotation of the turbine shaft 2 is transmitted from the sun gear 2 toward the primary shaft 22 while reversing the rotational direction via the first pinion gear 13 and the second pinion gear 14 (the reverse mode).

That is, in the forward/reverse switch mechanism, the forward mode and the reverse mode can be switched in accordance with the selection operation of the FWD clutch 16 and the REV clutch 17.

Belt Transmission Mechanism D

The belt transmission mechanism D comprises a primary pulley 21 to be described later and disposed behind and coaxially with the above-described switch mechanism C. The belt transmission mechanism D further comprises a belt 20 arranged between the primary pulley 21 and a secondary pulley 31 disposed in parallel to the primary pulley 21 and positioned away from the same.

The primary pulley 21 comprises a fixed conical plate 23 having a predetermined diameter and a movable conical plate 24 which is able to axially move with respect to the position of the primary shaft 22. The plate 23 is coaxially disposed to the above-described turbine shaft 2, is integrally formed with the primary shaft 22, an axial end portion of which is connected to the sun gear 12 of the forward/reverse switch mechanism C. The conical frictional surface of the fixed conical plate 23 and the conical frictional surface of the movable conical plate 24 form a belt receiving groove 21a having an essentially V-shaped cross sectional shape.

A cylinder 25 is secured adjacent to an outer surface 24a of the movable conical plate 24. In addition, a piston 26 secured adjacent to the primary shaft 22, is inserted into a portion adjacent to the inner surface of the cylinder 25 in an oil-tight manner. The above-described piston 26, the cylinder 25 and the movable conical plate 24 form a primary chamber 27 which is arranged to receive line pressure from the hydraulic circuit Q to be described later.

The movable conical plate 24 of the primary pulley 21 is, by oil pressure introduced into the primary chamber 27, moved in the axial direction so that the interval from the fixed conical plate 23 is changed. As a result, the effective diameter with respect to the belt 20 can be adjusted.

Basically, the secondary pulley 31 is structured similarly to the structure of the above-described primary pulley 21. The secondary pulley 31 is arranged in a manner such that its fixed conical plate 33 is, disposed on a secondary shaft 32, the secondary shaft 32 being disposed parallel with but away from the primary shaft 22 at a certain interval. Furthermore, a movable conical plate 34 is disposed in a manner such that it is able to move on the secondary shaft 32. The conical frictional surface 33a of the fixed conical plate 33 and a conical frictional surface 34a of the movable conical plate 34 form a belt receiving groove 31a having an essentially V-shaped cross sectional shape.

A cylinder 35 is coaxially secured adjacent to an outer surface of the movable conical plate 34. Furthermore, a piston 36, the portion of which is adjacent to the axial center, is secured to the secondary shaft 32 and oil tightly inserted into a portion adjacent to the inner surface of the cylinder 35. Piston 36, cylinder 35 and movable conical plate 34 form a secondary chamber 37. The secondary chamber 37 is arranged to receive line pressure from the hydraulic circuit Q similar to the structure of the primary pulley 21.

The secondary pulley 31 is arranged to also change its effective diameter from the belt 20 by a method similar to that of primary pulley 21 by bringing the movable conical plate 34 to fixed conical plate 33 and moving the same away Q from fixed conical plate 33.

The area of the movable conical plate 34 which receives oil pressure is arranged to be smaller than that of the movable conical plate 24 of the primary pulley 21.

Since the reduction mechanism E and the differential mechanism F are structured in a known manner, descriptions about them are omitted here.

Operation of Stepless Transmission

The operation of the stepless transmission Z will now be briefly described.

The rotational direction of the torque transmitted from engine A to the forward/reverse switch mechanism C via the torque converter B is set to the forward or the reverse direction before it is transmitted to the belt transmission mechanism D.

In the belt transmission mechanism D, when the effective diameter of the primary pulley 21 is adjusted in accordance with the introduction/discharge of hydraulic operating fluid from its primary chamber 27, the effective diameter of the secondary pulley, which is arranged to be moved in synchronization with the primary pulley by the action of the belt 20, is adjusted. In accordance with the thus adjusted ratio of the effective diameter of primary pulley 21 and that of secondary pulley 31, the change ratio between the primary shaft 22 and the secondary shaft 32 is determined.

The rotation of the secondary shaft 32 is then decelerated by the reduction mechanism E before it is transmitted to the differential mechanism F, the rotation being then transmitted from the differential mechanism F to the front wheels (omitted from illustration).

Hydraulic Pressure Circuit Q

In the above-described stepless transmission Z, the hydraulic circuit Q shown in FIG. 1 supplies adjusted oil pressure to the converter front chamber 7a and the converter rear chamber 10 for locking the lockup piston 6 of the torque converter B, the FWD clutch chamber 16 and the REV clutch chamber 17 of the forward/reverse switch mechanism C, the primary chamber 27 for the primary pulley 21 of the belt transmission mechanism D and the secondary chamber 37 of the secondary pulley 31.

An oil pump 40 is provided so as to supply oil pressure to the overall body of the hydraulic circuit Q, the oil pump 40 being operated by the engine A.

Figure 3:
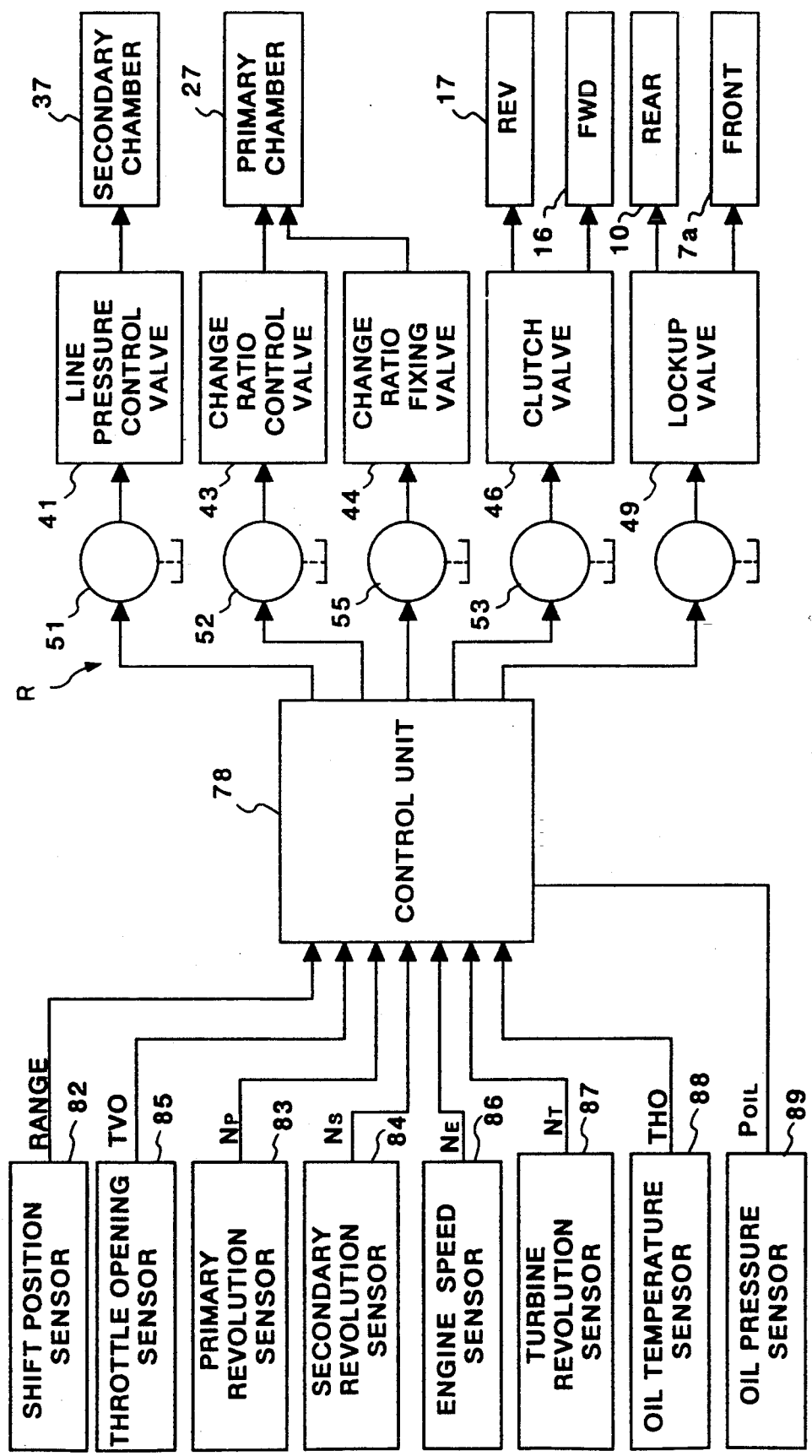
FIG. 3 is a block diagram which illustrates the connections of a control apparatus 78.

Referring to FIG. 1 and FIG. 3 which are schematic and block diagrams that illustrate the control system according to the embodiment, the correspondence between each of the control valves in the hydraulic circuit Q, duty solenoids or ON/OFF type solenoids for controlling them and the chambers to which oil pressure which has been governed by the control valves is supplied will become apparent.

The hydraulic circuit comprises a line pressure adjustment valve 41, a pressure reducing valve 42, a change ratio control valve 43, a change ratio fixing valve 44, a hydraulic pressure modification valve 45, a clutch valve 46, a manual valve 47, a converter relief valve 48 and a lockup control valve 49.

As shown in FIGS. 1 and 3, the change ratio control valve 43 is directly controlled by a primary duty solenoid 52. The change ratio fixing valve 44 is directly controlled by an ON/OFF type solenoid 55. The lockup control valve 49 is directly controlled by an ON/OFF type solenoid 54.

The hydraulic operating fluid discharged from the oil pump 40 is adjusted to a predetermined line pressure by the line pressure adjustment valve 41. Then, it is supplied to the secondary chamber 37 of the secondary pulley 31 via line 101. Another output from the line pressure adjustment valve 41 is, via line 102, supplied to the clutch valve 46. Clutch valve 46 causes the duty solenoid 53 to adjust hydraulic pressure at the line 102 to a predetermined level before sending it to the manual valve 47 and the lockup control valve 49 via a line 103.

The pressure reduction valve 42 reduces the level of the line pressure to be supplied to the secondary chamber 37 so that the pilot pressure to be supplied to the pressure modification valve 45, the change ratio control valve 43, the change ratio fixing valve 44 and the clutch Q valve 46 can be adjusted.

The pilot pressure for controlling the line pressure (secondary pressure) can be adjusted by electrically controlling the duty ratio of a duty solenoid 51. That is, hydraulic pressure the level of which has been controlled by the solenoid 51 is introduced into the pilot chamber so that the pressure modification valve 45 is opened/closed in accordance with the level of the thus introduced hydraulic pressure. The fluid in the line 104 the level of which has been controlled in accordance with opening/closing of the pressure modification valve 45 is introduced into a pilot chamber of the line pressure adjustment valve 41 so that desired line pressure is obtained. Although line pressure adjustment valve 41 may directly control the pressure level by a duty solenoid or the like, another structure may be employed in which the pressure modification valve 45 is provided. In this case, a proper pressure level in which an oil leak or the like in the hydraulic circuit has been compensated can be obtained.

The change ratio control valve 43 is controlled by the primary duty solenoid 52. Hydraulic pressure the level of which has been generated by the change ratio control valve 43 is supplied to the primary chamber 27 via the change ratio fixing valve 44. The change ratio fixing valve 27 is controlled by the ON/OFF type solenoid 55. In a state where the solenoid 55 is turned on, a line 107 connected to the primary chamber 27 is allowed to communicate with a line 106, while the same is closed when the solenoid 55 is turned off. That is, the pressure which acts on the primary chamber 27 can be fixed to the present level, that is, the change ratio can be fixed regardless of the status of the change ratio control valve 43 by turning off the solenoid 55.

The change ratio control valve 43 is controlled by the primary duty solenoid 52. In a state where the solenoid 52 is turned on, hydraulic pressure in the primary chamber 27 is drained via lines 107, 106 and 108 and a relief ball 105. That is, no pressure is generated in the primary chamber 27. On the contrary, in a state where the solenoid 52 is turned off, the above-described drain passage 108 is closed and hydraulic pressure is introduced into the primary chamber 27 via an orifice 109 and the line 106. The control valve 43 accommodates two spools each of which has a tapered surface. Since the supply of hydraulic pressure is performed via the orifice 109, the pressure in the primary chamber 27 does not rise rapidly.

The clutch valve 46 is controlled by the duty solenoid 53. Hydraulic pressure the level of which has been controlled by the solenoid 53 is supplied to the manual valve 47 and the lockup control valve via the line 103.

In the forward mode, the line pressure is applied to the FWD clutch chamber 16 via the line 103, the valve 47 and a line 110. On the other hand, hydraulic pressure in the REV clutch chamber 17 is discharged via a line 112.

On the contrary, the supply of the line pressure is not limited to the FWD clutch chamber 16 via the line 110. That is, if the lockup control valve 49 is in a non lockup state, the line pressure is also supplied to the REV clutch chamber 17 via the lines 103, 113 and 112. Thus, the reverse mode is realized.

The lockup control valve 49 is controlled by the ON/OFF solenoid 54. In a state where the valve 49 performs the locking operation, a line 116 connected to the converter rear chamber 10 is allowed to communicate with the relief valve 48 via a relief line 115. Thus, the lockup status is realized.

Thus, hydraulic pressure level at the hydraulic circuit Q is controlled.

DETAILED DESCRIPTION OF LINE PRESSURE CONTROL

Connection of Control System

FIG. 3 illustrates signals to be supplied to a control unit 78 which controls the line pressure and signals to be transmitted from the same. As shown in FIG. 3, the control unit 78 is connected to each of the solenoid valves 51, 52 and 53 so that each of the solenoid valves 51, 52 and 53 is controlled by the control unit 78. Referring to FIG. 3, the above-described control unit 78 is arranged to receive shift position signal RANGE supplied from a sensor 82 which detects the shift position (D, 1, 2, R, N and P) selected in accordance with the operation of a driver. Furthermore, the control unit 78 receives primary pulley revolution signal $N_P$ supplied from a revolution sensor 83 (omitted from illustration in FIG. 2) which detects the revolution $N_P$ of the primary shaft 22. In addition, the control unit 78 receives secondary pulley revolution signal $N_S$ (or vehicle speed) supplied from a revolution sensor 84 (omitted from illustration in FIG. 2) which detects revolution $N_S$ of the secondary shaft 32. The control unit 78 receives throttle opening degree signal TVO supplied from an opening degree sensor 85 (omitted from illustration in FIG. 2) which detects throttle opening degree TVO of the engine A. In addition, the control unit 78 receives revolution signal $N_E$ supplied from a revolution sensor 86 (omitted from illustration in FIG. 2) which detects engine revolution $N_E$. The control unit 78 further receives turbine revolution signal $N_T$ supplied from a turbine revolution sensor 87 (omitted from illustration in FIG. 2) which detects revolution $N_T$ of the turbine shaft 2 of the torque converter B. The control unit 78 further receives oil temperature THO supplied from a sensor 88 which detects the temperature of oil positioned in the hydraulic circuit Q and hydraulic pressure signal P supplied from a sensor 89 which measures the pressure level at the secondary chamber 37.

Therefore, the engine output torque is transmitted to the forward/reverse switch mechanism C via the torque converter B in a manner such that the torque is transmitted in the form of converter transmission torque which is transmitted via the turbine runner 4 and lockup clutch transmission torque which is transmitted via the lockup piston 6. Therefore, the turbine torque to be transmitted to the primary shaft 22 must be determined in consideration of the above-described two torque transmission patterns. That is the reason why the line pressure (to be abbreviated to "clutch pressure" hereinafter) at the line 102 must precisely be controlled. However, the line pressure at the line 101 realized by the line pressure adjustment valve 41 and the clutch pressure realized by the clutch valve 46 closely relate to each other. Therefore, the line pressure control and the clutch pressure control according to the embodiment will be described.

Figure 4A:
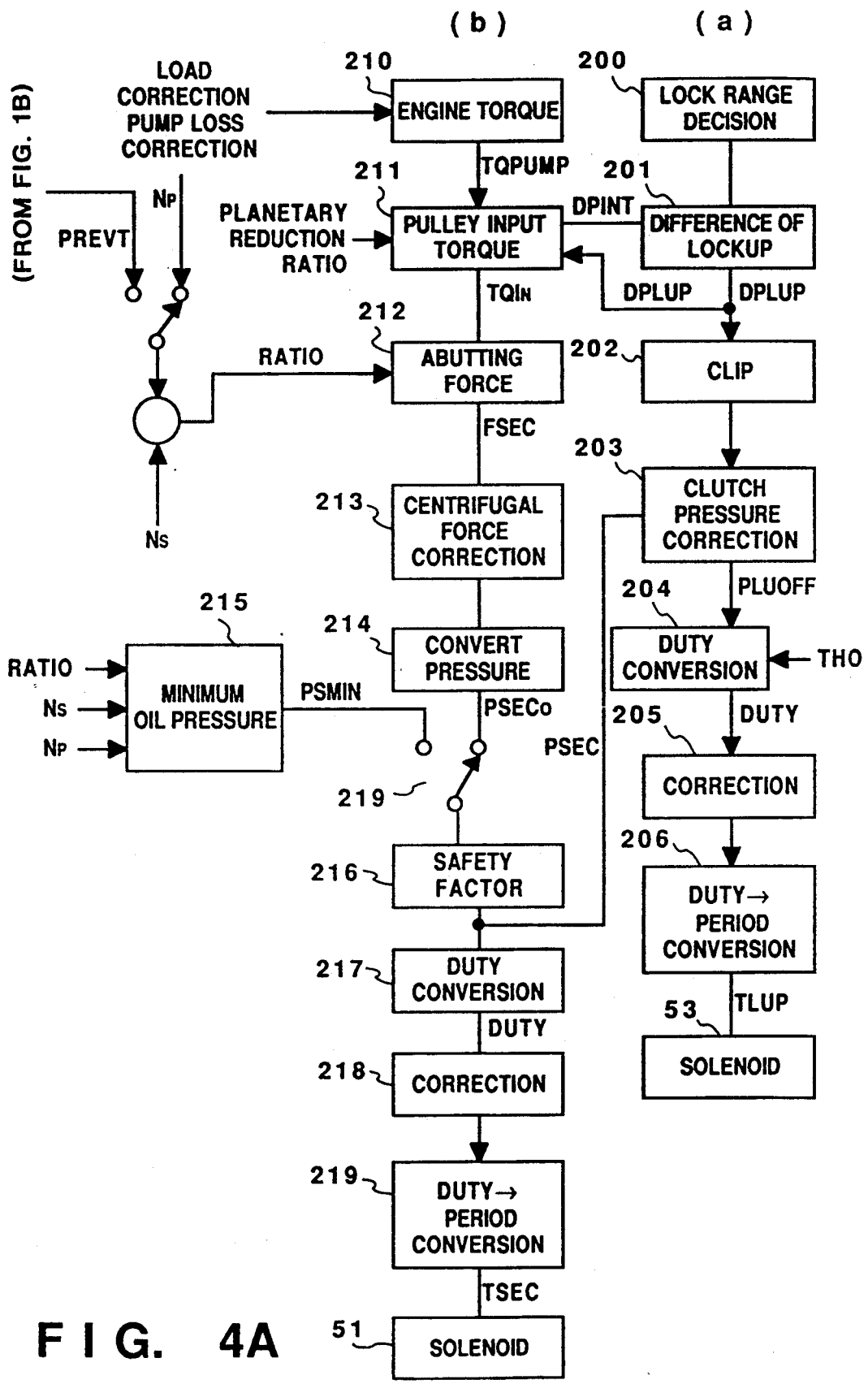
FIGS. 4A and 4B are block diagrams which illustrate the overall portion of an embodiment of the control according to the present invention.
Figure 4B:
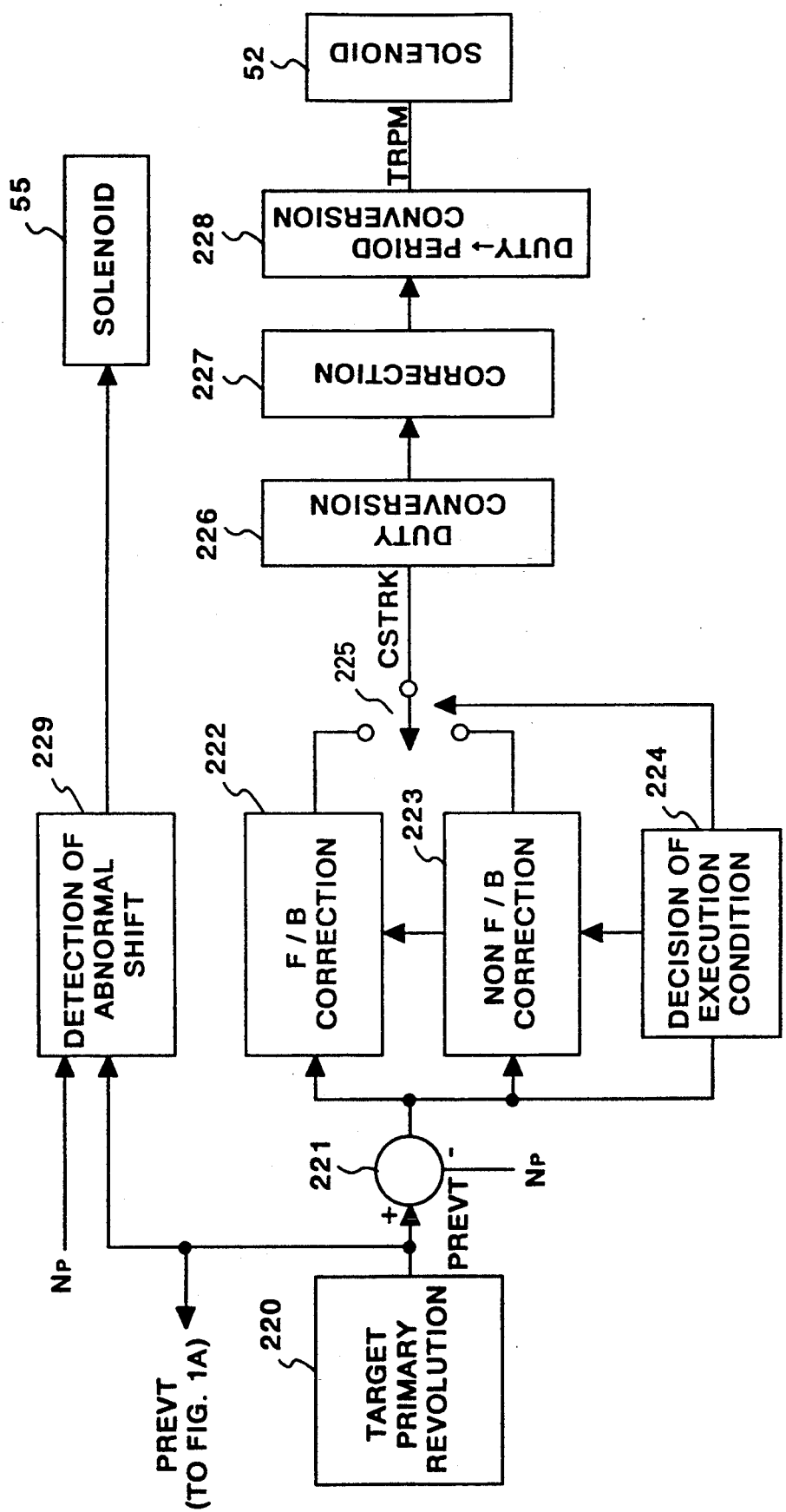

FIGS. 4A and 4B are overall block diagrams which illustrate the line pressure control according to the embodiment. As shown in the two drawings, in the control operation according to this embodiment, three duty signals are transmitted which comprise signal TLUP to be supplied to the duty solenoid 53 for controlling hydraulic pressure acting on the lockup piston 6, that is, for controlling the pilot pressure to be supplied to the control valve 41, signal TSEC to be supplied to the duty solenoid 51 for controlling the basic line pressure and signal TPRM to be supplied to the duty solenoid 52 for controlling hydraulic pressure acting on the primary chamber 27, that is, for controlling the pilot pressure to be supplied to the control valve 44.

Outline of Lockup Clutch Control

Referring to FIG. 4A, the generation control of signal TLUP is performed as follows: if it has been, in step 200, determined that the present operation state is in a lock range, differential signal DPLUP is calculated in step 201. FIG. 5A illustrates the map characteristics for determining the lock range. If it has been determined that the present operation state is in the lock range in accordance with the logic shown in FIG. 5A, lockup clutch differential pressure DPLUP is, in step 201, in accordance with the lockup transmission torque initial value TQINT calculated from engine output torque TQPUMP (to be described later), DPLUP being the target value of the difference in hydraulic pressure across the piston 6.

The lockup clutch differential pressure DPLUP is, in step 202, then subjected to the limit correction in accordance with the characteristics shown in FIG. 5B (a) so that the excessive hydraulic pressure is not applied.

The thus clipped DPLUP is corrected in step 203 in consideration of the line pressure (which is determined by signal PSEC which determines hydraulic pressure to be applied to the secondary chamber 37). That is, referring to FIG. 5B (c), the maximum clutch pressure is calculated in accordance with line pressure PSEC. The thus obtained quantity is arranged to be maximum clutch pressure $PLUOFF_{MAX}$. While performing the limit control in which $PLUOFF_{MAX}$ thus calculated is arranged to be the maximum value, DPLUP is converted into clutch pressure PLUOFF in accordance with the characteristics shown in FIG. 5B (b). The clutch pressure PLUOFF is converted into the duty ratio in step 204 before it is subjected to the power supply voltage correction in step 205. Then, the corrected duty is converted into the cycle by step 206 so as to transmitted to the solenoid 53. The duty conversion will be described later.

Outline of Primary Hydraulic Pressure Control

An outline of the procedure of controlling hydraulic pressure at the primary chamber now will be described. First, target value PREVT of the primary pulley revolution is, in step 220, read from the map in accordance with shift signal RANGE, throttle opening degree TVO, operation mode MODE and present revolution $N_S$ of the secondary pulley. The characteristics of the map is shown in FIG. 6. Then difference DNP between target revolution PREVT and the present primary pulley revolution NP is step calculated in 221, the DNP thus obtained being then subjected to the feedback correction step 222 and the non-feedback control correction step 223 so that the duty of the solenoid 52 is controlled. In step 224, the execution conditions for the feedback control are determined. If the execution conditions are met, a selector 225 selects the DNP which has been subjected to the feedback correction. If the execution conditions are not met, the selector 225 selects the DNP which has not been subjected to the feedback correction. The thus selected DNP is transmitted to a duty conversion step 226. Duty conversion step 226 converts the output of the selector 225 to a duty ratio. The duty ratio is subjected at step 227 to a correction operation for correcting it when it exhibits an exceptional value. The corrected ratio is then subjected to a duty-period conversion at step 228, so that the solenoid is energized during the period corresponding to the ratio.

The conversion into the duty ratio is performed similarly to the above-described case of the lockup operation.

Figure 7A:
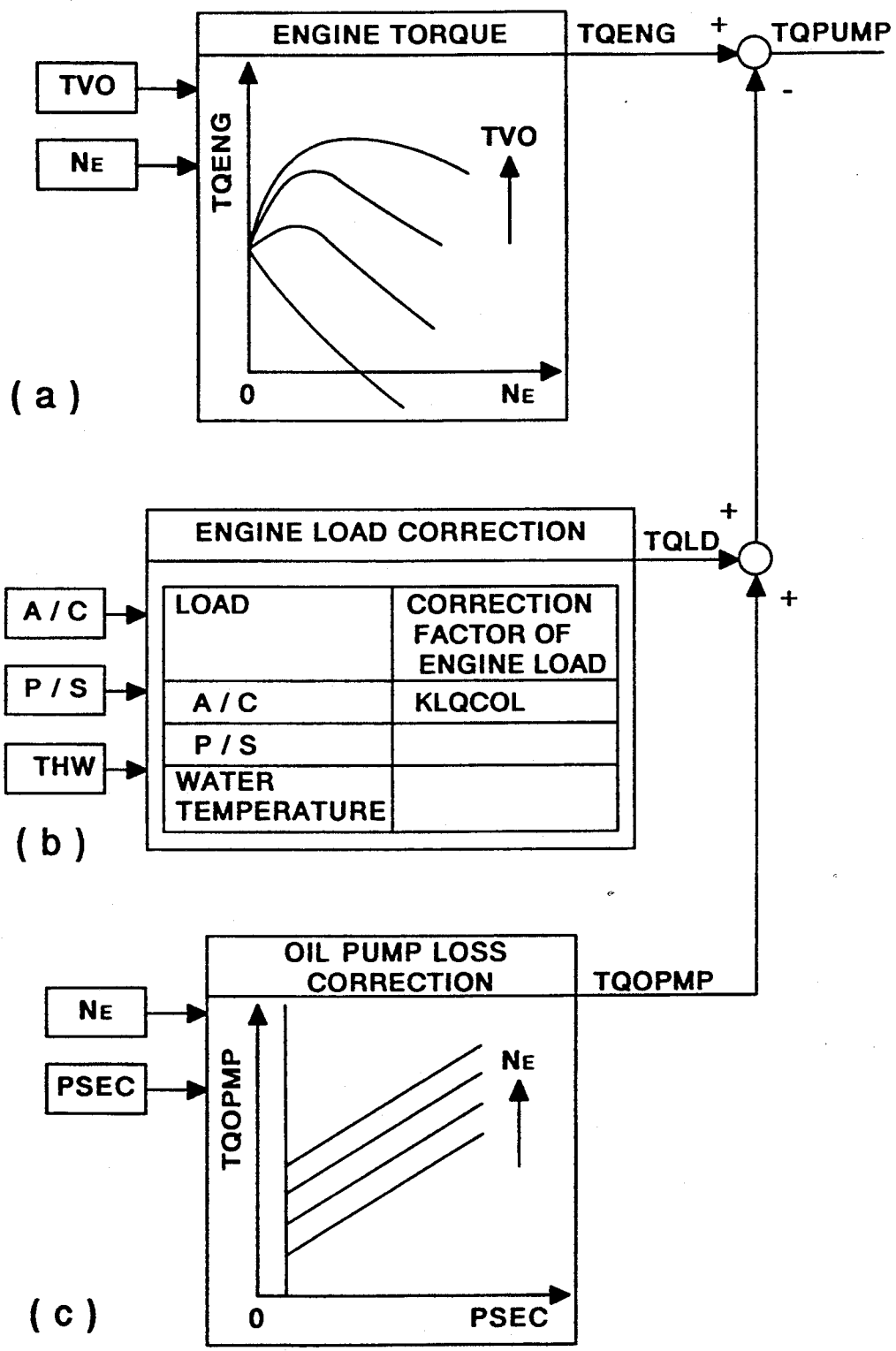
FIG. 7A is a schematic diagram illustrating a control for calculating engine torque TQPUMPA.

Hydraulic pressure (which corresponds to the line pressure according to this embodiment) to be applied to the secondary chamber 37 and as shown in FIG. 4A (b) is controlled as follows:

First, engine output torque TQPUMP is calculated in step 210. As shown in FIG. 7A (a), the calculation of TQPUMP is performed in a manner such that load correction TQLD and correction quantity TQOPMP due to the oil pump loss are subtracted from engine output torque TQENG calculated in accordance with throttle opening degree TVO and engine revolution $N_E$. The engine load is exemplified by the load due to the air conditioner or the power steering or the like as shown in FIG. 7A (b). Furthermore, according to the embodiment, the correction in accordance with engine water temperature THW is considered. The pump loss is, as shown in FIG. 7A (c), corrected by a calculation performed in accordance with line pressure PSEC to be applied to the secondary pulley and engine revolution $N_E$.

In accordance with engine torque TQPUMP calculated in consideration of the above described correction, torque TQIN to be supplied to the primary pulley from the forward/reverse switch mechanism C is calculated in step 211. As is described later, the engine output torque TQPUMP is accurately divided into two portions, that is, torque TQLUP Q transmitted via the lockup clutch and torque TQCVD transmitted via the converter so as to accurately calculate the synthesized torque to be transmitted to the primary pulley. In step 212, TQIN thus obtained is inputted and force FSEC necessary to abut the pulley is calculated from change ratio RATIO which has been inputted. The calculation of FSEC will be described later with reference to FIG. 7C. Abutting force FSEC thus obtained is subjected to the centrifugal correction in step 213 before it is converted into pressure PSECO in step 214. Therefore, PSECO thus obtained is calculated by correcting force FSEC in accordance with centrifugal force, force FSEC being force necessary to properly transmit the output torque transmitted via the torque converter and the lockup mechanism to the primary pulley in accordance with change ratio RATIO.

On the other hand, in step 215, pressure PSMIN which is the minimum force necessary to perform the gear change operation is calculated in accordance with change ratio RATIO and primary pulley revolution $N_P$ and the like. A selector 219 selects the larger value upon the result of a comparison made between PSECO and PSMIN, the selected value being made to be a signal for operating the duty solenoid 51 which controls the line pressure. The process in which the centrifugal force is generated and the reason why the larger value is selected from a group consisting of PSECO and PSMIN by the selector 219 will be described with reference to FIGS. 7C and 8.

Then, the calculation of the torque to be supplied to the pulley performed in step 211 will be described with reference to FIG. 7B. As described above, that control is performed in a manner such that two types of torque to be transmitted via the turbine runner 4 and torque to be transmitted via the lockup piston 6 are taken into consideration when the engine output is transmitted to the primary pulley of the belt transmission mechanism D via the torque converter B and the lockup clutch. That is, engine output torque TQENG is divided into two directions toward the torque converter and the lockup mechanism. However, the thus divided torque passes through different transmission passages, causing the torque transmission ratio to the primary shaft 22 to become different. Therefore, in order to accurately recognize the torque to be transmitted to the shaft 22, the way in which the engine output torque TQENG is divided into two portions must be accurately recognized.

Figure 7B:
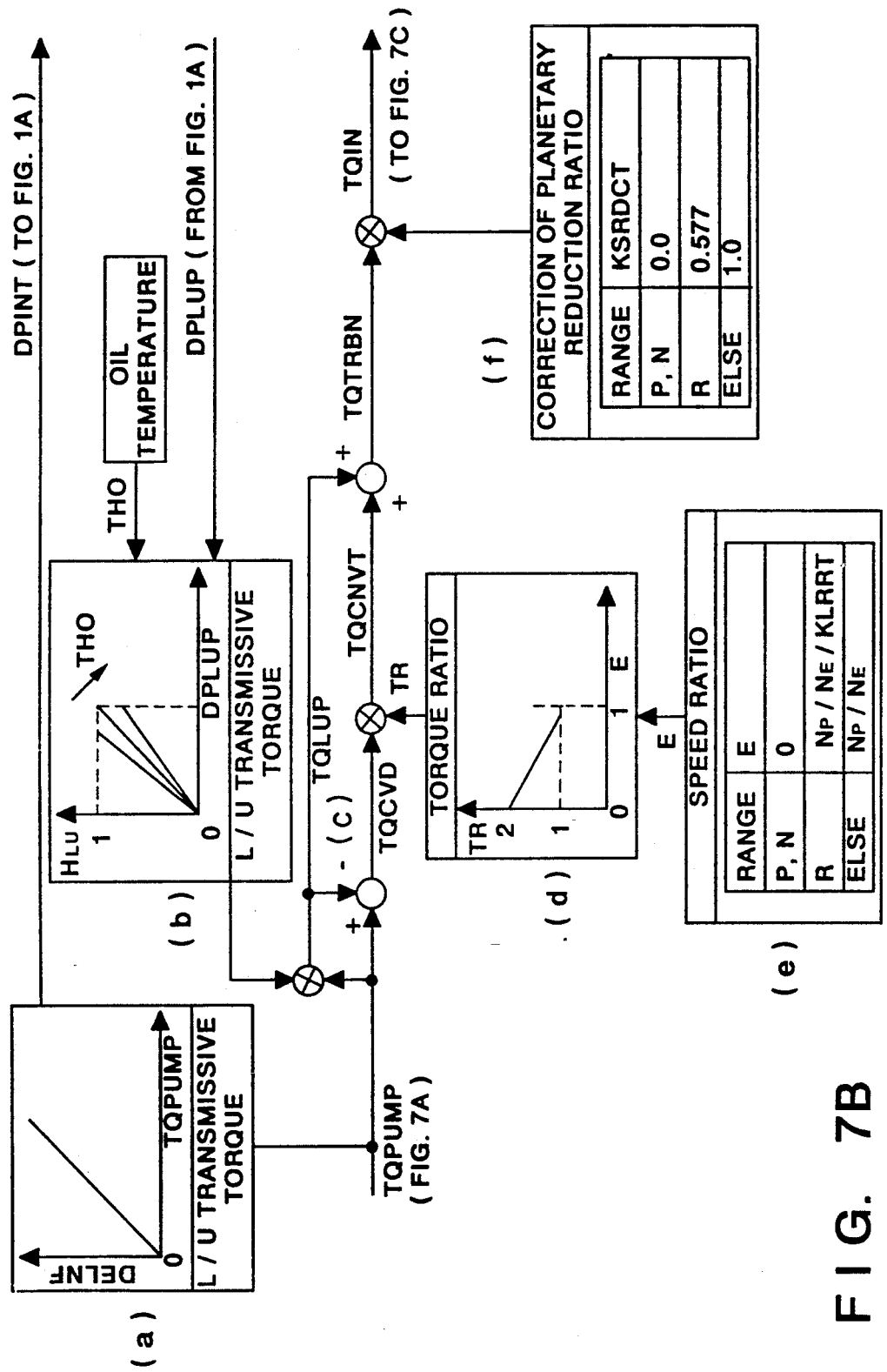
FIG. 7B is a schematic diagram illustrating a control for calculating turbine torque TQTRBN.

According to the embodiment, the torque to be divided into two portions is calculated as shown in FIG. 7B in a manner such that torque TQLUP to be transmitted by the lockup is calculated, the thus obtained torque TQLUP being then subtracted from engine output torque TQPUMP so that torque TQCVD to be transmitted to the torque converter is obtained. The same may be calculated in a contrary manner arranged such that the torque to be transmitted to only the torque converter is obtained so as to obtain the torque to be transmitted to the lockup.

First, initial value DPINT of the differential pressure across the lockup piston is calculated from engine output TQPUMP and in accordance with the characteristics shown in FIG. 7B (a). The characteristics shown in FIG. 7B (a) are uniquely determined in accordance with the lockup mechanism. As described above, DPINT is converted into differential pressure DPLUP in step 201 shown in FIG. 4A while taking the determination conditions for the lockup range (see FIG. 5A) into consideration, differential pressure DPLUP showing the pressure level to be transmitted to the lockup piston 6. The torque to be actually transmitted to the piston 6 is determined in accordance with the viscosity (that is, the temperature of oil) in the converter front chamber 7a. Therefore, in accordance with the characteristics shown in FIG. 7B (b), that is, in accordance with oil temperature THO, lockup transmission ratio $H_{LU}$ is determined so as to cause torque in inverse proportion to THO to be transmitted to the piston 6, transmission ratio $H_{LU}$ being the quantity range from 0 to 1 as shown in FIG. 7B (b). In accordance with transmission ratio $H_{LU}$ and engine torque TQPUMP, torque TQLUP to be actually transmitted to the lockup piston 6 is, as shown in FIG. 7B (c), calculated from the following equation:

$$TQLUP = TQPUMP \times H_{LU}$$

Therefore, torque TQCVD of the engine output to be solely supplied to the torque converter becomes as follows:

$$TQCVD = TQPUMP - TQLUP$$

Therefore, torque TQCNVT to be transmitted from only the converter is calculated in consideration of torque ratio TR shown in FIG. 7B (e), resulting as follows:

$$TQCNVT = TQCVD \times TR = (TQLUP) \times TR$$

Therefore, composite torque TQTRBN from the lockup and the converter becomes as follows:

$$TQTRBN = TQLUP + TQCNVT$$

The thus obtained torque is supplied to the switch mechanism C before it is transmitted to the primary pulley. Since the above described switch mechanism C has a planetary mechanism fastened thereto, final torque TQIN is calculated as follows from TQTRBN in consideration of reduction ratio KSRDCT due to the planetary mechanism:

$$TQIN = TQTRBN \times \text{reduction ratio}$$

The value of reduction ratio KSRDCT is shown in FIG. 7B (f).

Then, the procedure of calculating torque ratio TR will be described with reference to FIGS. 7B (d) and (f). The torque ratio is the ratio of the torque of the input torque to be transmitted by the converter, the torque ratio being obtained from speed ratio E. The speed ratio E is determined in accordance with the ratio ($N_P/N_E$) between primary revolution $N_P$ and engine revolution $N_E$ and speed change range (RANGE) in a manner shown in FIG. 7B (e). Assuming that KLRRT is the reduction constant at the reverse mode (when the REV position is selected) of the forward/reverse mechanism, speed ratio $E_R$ becomes $N_P/N_E/KLRRT$. When RANGE is positioned at P or N, E becomes "0". The torque ratio is determined in accordance with the characteristics shown in FIG. 7B (d). The characteristics is set to maximum value "2" when speed ratio E is zero, that is, when the vehicle is stopped, the same being gradually reduced from "2" when speed ratio E is gradually enlarged from zero. When the speed ratio reaches about 0.8, torque ratio TR circulates to 1 and is then maintained at "1".

As described above, the torque to be supplied to the pulley, that is, torque TQIN to be transmitted to the primary pulley shaft 22 can be accurately obtained in step 211.

Then, the procedure of calculating secondary pressure PSEC will be described by describing the control performed in steps 212 through 216.

First, the procedure of calculating the force to be abutted in step 212 shown in FIG. 4A will be described with reference to FIG. 7C. The abutting force is the force to be applied to the piston 36 in order to maintain the necessary effective diameter of the primary pulley and that of the secondary pulley against the tension of the belt. Since the effective diameter is changed in accordance with the change ratio, the abutting force must be changed in accordance with change ratio RATIO.

Figure 7C:
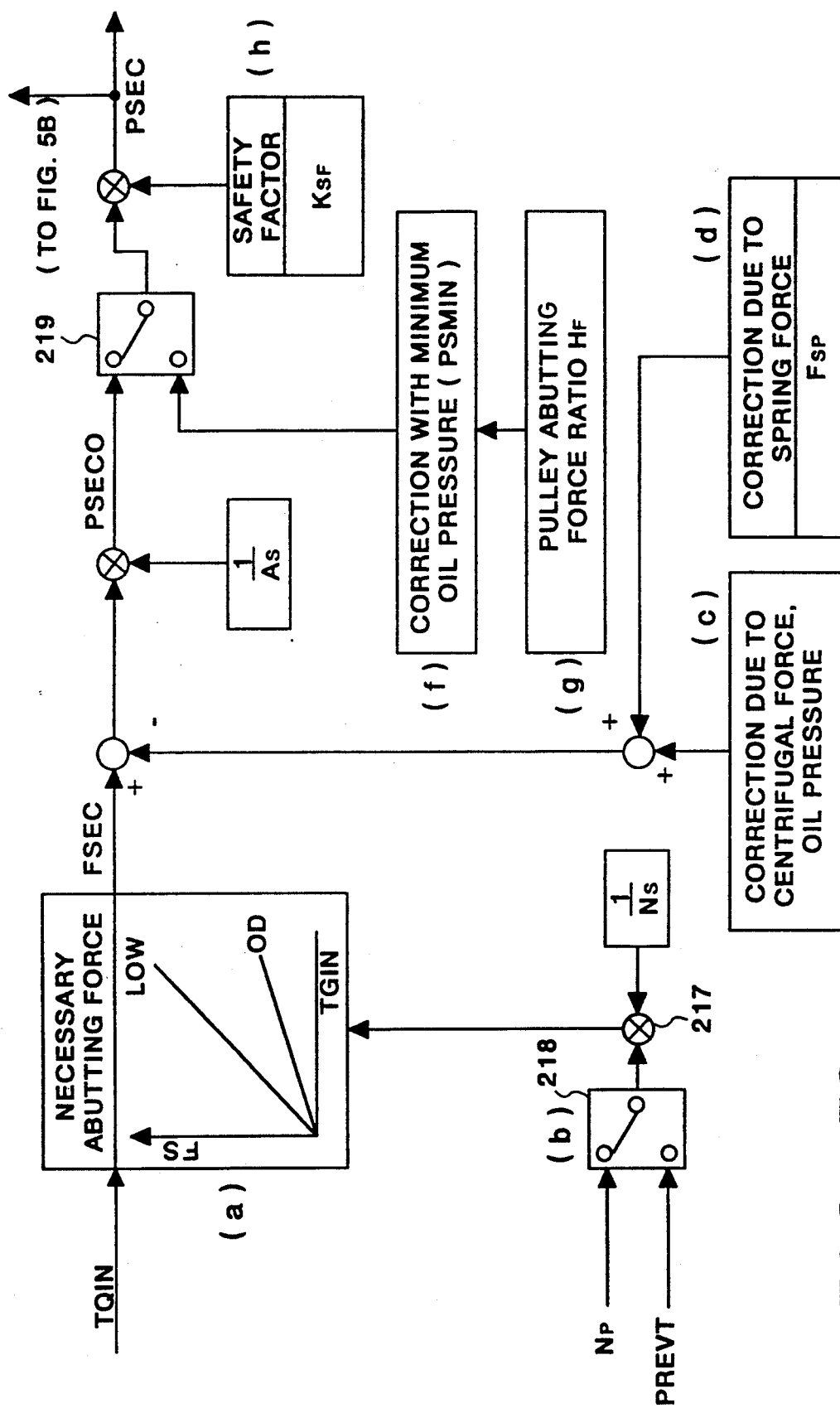

Change ratio RATIO is calculated in a procedure as shown in FIG. 7C.

First, as shown in FIG. 7C (b), a comparison is made in selector 231 between present primary pulley revolution $N_P$ and target pulley revolution PREVT calculated in step 220. The reason for this lies in that the force determined to be larger between the abutting force necessary to maintain the present change ratio and the abutting force necessary after the gear change must be generated in order to obtain the necessary abutting force. Assuming that it has been determined by the selector 231 that NP is larger than PREVT, RATIO can be expressed in 231 as follows:

$$RATIO = N_P/N_S$$

The division of $N_p$ by $N_s$ is performed by multiplier 232 by $1/N_S$.

In accordance with the thus obtained RATIO and input torque TQIN, abutting force FSEC is calculated in accordance with the characteristics shown in FIG. 7C (a). In this case, the necessary abutting force is in proportion to the degree of the change ratio, that is, degree of overdriving.

Then, the detailed procedure of correcting the centrifugal hydraulic pressure will be described. The reason why the centrifugal hydraulic pressure correction must be performed as shown in FIGS. 7C (c) through (g) and problems taken place in accordance with that centrifugal hydraulic pressure correction will be described with reference to FIG. 8.

Figure 8A:
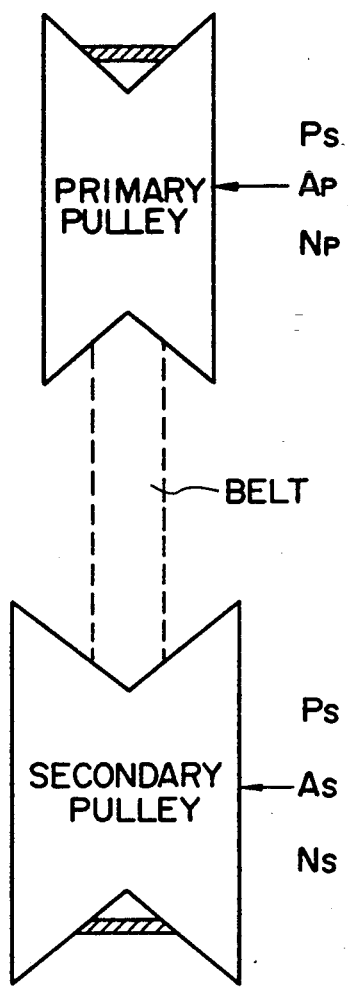
FIGS. 8A through 8D are a schematic diagram and graphs illustrating a status in which a problem arises when the centrifugal force correction is performed.

As shown in FIG. 8A, when line pressure Ps (which is determined by the solenoid 51 on the secondary side) which is commonly applied to the primary pulley having effective cross sectional area $A_P$ and the secondary pulley having effective cross sectional area $A_S$ in a case where the above described two pulleys are rotated by a belt is taken into consideration, abutting force $F_P$ and that $F_S$ to be applied to the corresponding pulleys become as follows:

$$F_p = A_p \cdot P_s + K_p \cdot N_p^2 \quad (1)$$

$$F_s = A_s \cdot P_s + K_s \cdot N_s^2 + F_{sp} \quad (2)$$

where symbol K denotes a predetermined constant, the second term is the force due to the centrifugal force and the third term of the second equation is the force due to the spring (represented by 38 in FIG. 2). It is an essential fact that ratio HF (to be expressed by the following equation) of the abutting forces to be applied to the pulleys must be maintained at a predetermined value. If it cannot be set to a proper value, a problem will arise, for example, in that the effective diameter of the secondary pulley is not changed although that of the primary pulley has been reduced.

$$HF = F_p/F_s \quad (3)$$

Figure 8B:
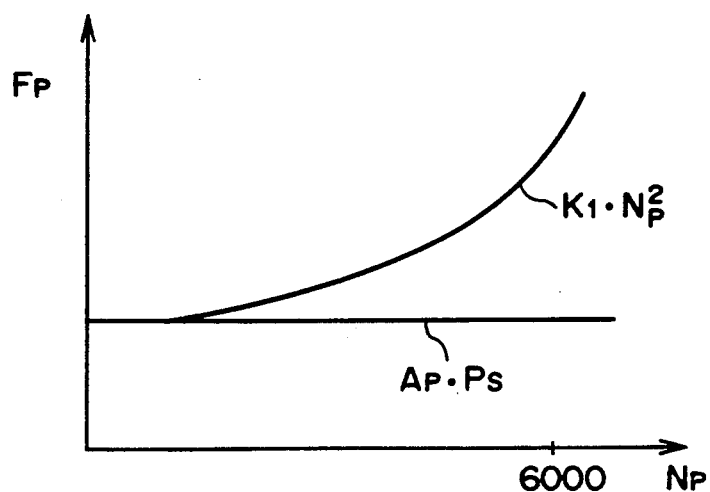
Figure 8C:
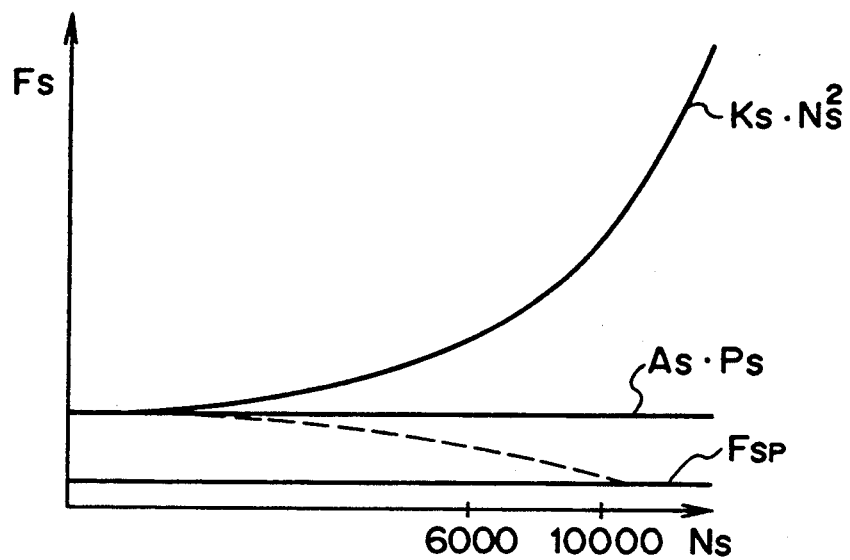
Figure 8D:
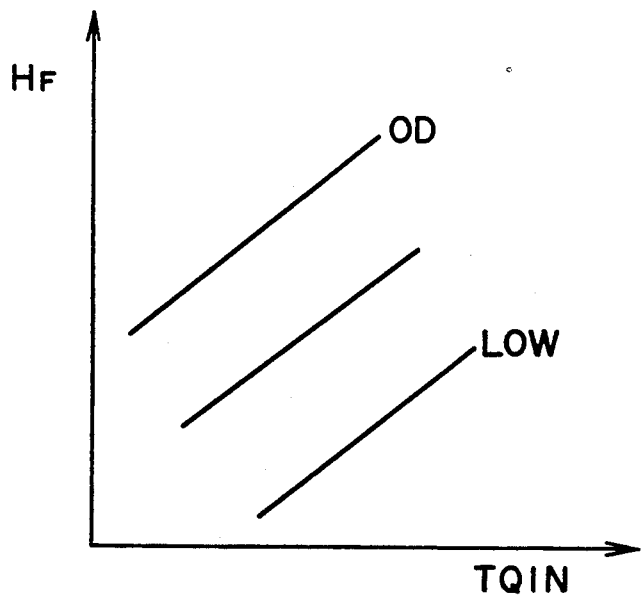

FIG. 8B is a graph which illustrates the change characteristics of $F_P$ with respect to primary pulley revolution $N_P$. FIG. 8C is a graph which illustrates those of $F_S$ with respect to the same. As shown in those drawings, the abutting force due to the centrifugal force is increased proportional to the square of revolution $N_P$ ($N_S$). Since the centrifugal force acts in a direction in which is the pulley is abutted, the degree corresponding to it is subtracted from the line pressure, causing the load to be applied to the hydraulic pump to be reduced. Therefore, the fuel consumption can be reduced. A dashed line of FIG. 8C denotes the change in pressure $A_S \times P_S$ in a case where line pressure $P_S$ has been reduced by a degree corresponding to the contribution due to the pressure caused from the centrifugal force. Since the ratio of the areas of the two pulleys becomes as follows:

$$A_P : A_S = 2:1$$

the reduction in $A_P \cdot A_S$ becomes too large although be maintained at a substantially constant value when line pressure $P_S$ is reduced by a degree corresponding to the centrifugal correction. Therefore, abutting force ratio $H_F$ cannot be maintained at the proper value. The reason for this lies in that the absolute value of the contribution of the centrifugal force is insufficient although the contribution of the centrifugal force acts in proportion to the revolution. Therefore, when the degree of the centrifugal correction is enlarged considerably, the line pressure is excessively reduced. Therefore, there arises a fear in that the line pressure will be lowered below the necessary level (this tendency becomes apparent the more the operation speed is high since revolution $N_S$ of the secondary pulley is raised). That is, assuming that line pressure $P_S$ has been reduced by $\Delta P$ due to the centrifugal force $\Delta P$. Therefore, according to this embodiment, the reduction in Ps is supervised so as to perform the limit correction in the case where the line pressure is reduced below the necessary level. In this case, lower limit value PSMIN is defined by the following equation which is the solution of Equation (3) for S:

$$PSMIN = \frac{(K_S \cdot N_S^2 + F_{SP}) \times H_F - K_P \cdot N_P^2}{A_P \cdot A_S \cdot H_F} \quad (4)$$

Referring back to FIG. 7C, necessary abutting force FSEC is subjected to the centrifugal correction and the force correction as shown in FIGS. 7C (c) and 7C (d). Then, pressure PSECO applied to the piston 36 of the secondary pulley is calculated from piston area $A_S$, that is, $$PSECO = \frac{FSEC - (K_S \cdot N_S^2 + F_{SP})}{A_S}$$

Then, as shown in FIG. 7C (c) the selector 219 selects PSECO or PSMIN which has been determined to be relatively smaller. Then, the selected factor is multiplied by safety factor KSF at step 216 (FIG. 4B) in order to ensure the operation as shown in FIG. 7C (h), the result of this multiplication being arranged to be PSEC. As illustrated in FIG. 4A, duty conversion step 217 converts the output of the selector to a duty ratio. The duty ratio is then subjected at step 218 to a correction operation for correcting it when it exhibits an exceptional value. The corrected ratio is then subjected to a duty-period conversion at step 209, so that the solenoid 51 is energized during the period corresponding to the ratio.

Thus, line pressure PSEC can be secured so that the gear change operation is reliably performed regardless of the change ratio, that is, pulley revolution $N_S$.

The control to which the solenoids 51, 52 and 53 are subjected will now be described. Control is performed in a manner such that the operation frequency for the duty solenoid is controlled in accordance with the quantity of the hydraulic pump discharge (that is, engine revolution $N_E$) and the duty ratio in order to reduce the pulsation of hydraulic pressure and to improve the durability of the solenoid.

Figure 9:
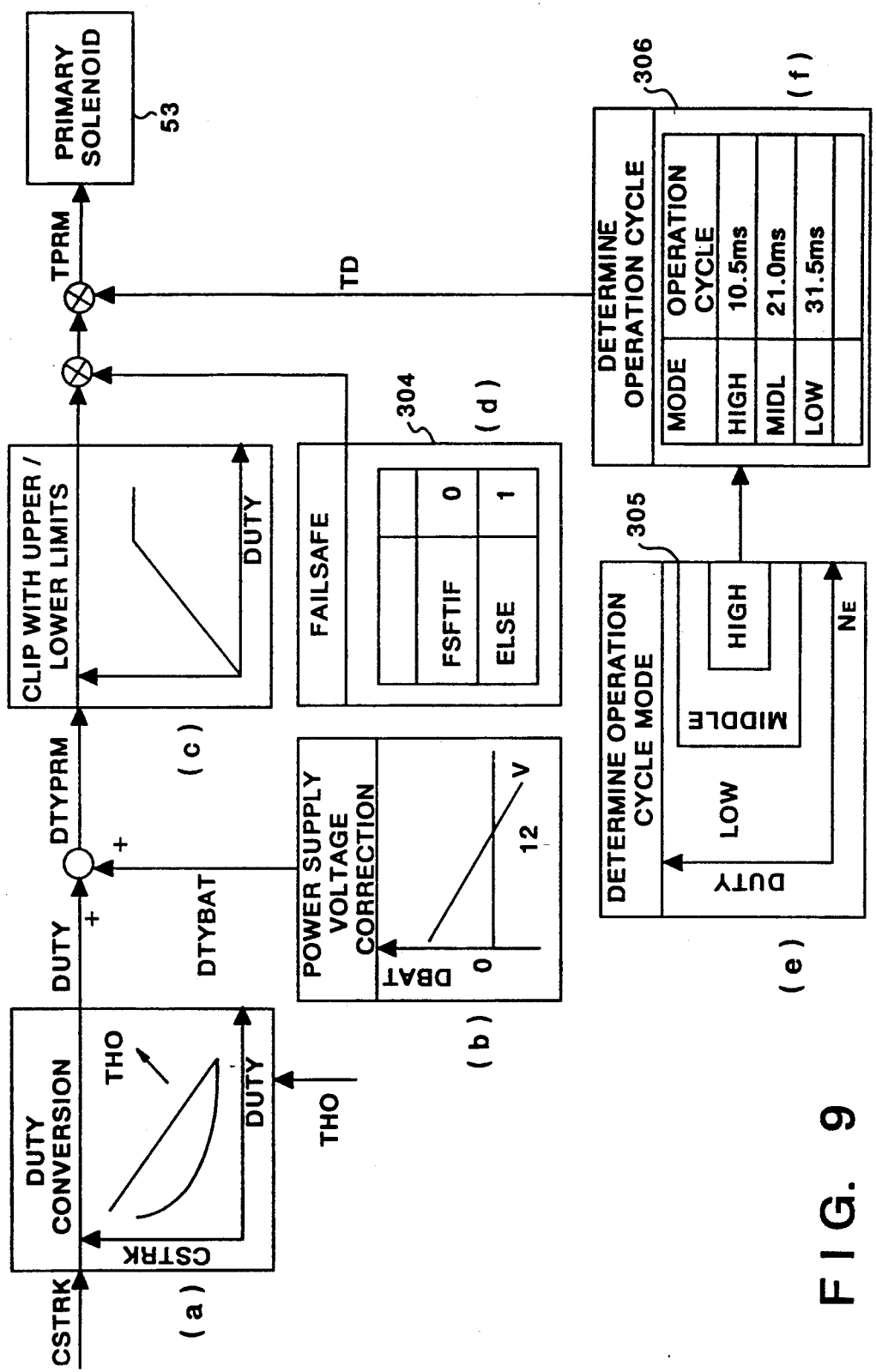
FIG. 9 is a schematic diagram illustraing a method of controlling the operation cycle of a duty solenoid.

FIG. 9 illustrates the above-described control.

Since the controls to be respectively applied to the above-described three solenoids are the same, the duty conversion for the solenoid 52 will be described. First, signal CSTRK is converted into the duty referring to FIG. 9 (a). When oil temperature THO is high, output duty is set to be a relatively large value. Referring to FIG. 9 (b), the duty is subjected to the correction of the battery power supply voltage. Then, referring to FIG. 9 (c), the upper and the lower limits are clipped before the fail-safe process is performed in step 304 of FIG. 9 (d), wherein XSFT1F is a flat for storing the generation of the fail safe status. The fail safe is a control performed so as to overcome a failure including the above-described abnormal gear change.

On the other hand, the mode of the operation cycle for the solenoid is, referring to step 305 of FIG. 9 (e), set in accordance with engine revolution NE and DUTY obtained referring to FIG. 9 (a). According to this embodiment, the cycle mode is arranged to be LOW, MIDDLE and HIGH by determining the zone. Then, referring to step 306 of FIG. 9 (f), the operation cycle is determined to any of 10.5 ms (LOW), 21.0 ms (MIDDLE) and 31.5 ms (HIGH) in accordance with the zone determination. As described above, according to the embodiment, the duty control is performed in a manner such that operating frequency is controlled in accordance with engine revolution $N_E$ and duty value. The reason why the frequency control method is employed lies in that the arrangement in which the duty ratio is varied while making the frequency constant will cause the pulsation to easily influence the pump output. According to this embodiment, the operation frequency is arranged to be higher proportional to the quantity of discharge from the hydraulic pump 40. The reason for this lies in that the operation cycle is shortened so as to reduce the ripple since the more the discharge quantity becomes the larger the amplitude of the oil pulsation becomes.

CONTROL PROCEDURE

Thus the line pressure in the hydraulic control apparatus and the duty solenoid in the hydraulic circuit are controlled in the stepless transmission including a torque converter having a lockup. The above-described control may be performed by a digital computer or a analog computer. Then, the procedure of the above described control performed by a digital computer will be described with reference to FIGS. 10 through 14.

MAIN PROCEDURE

Figure 10:
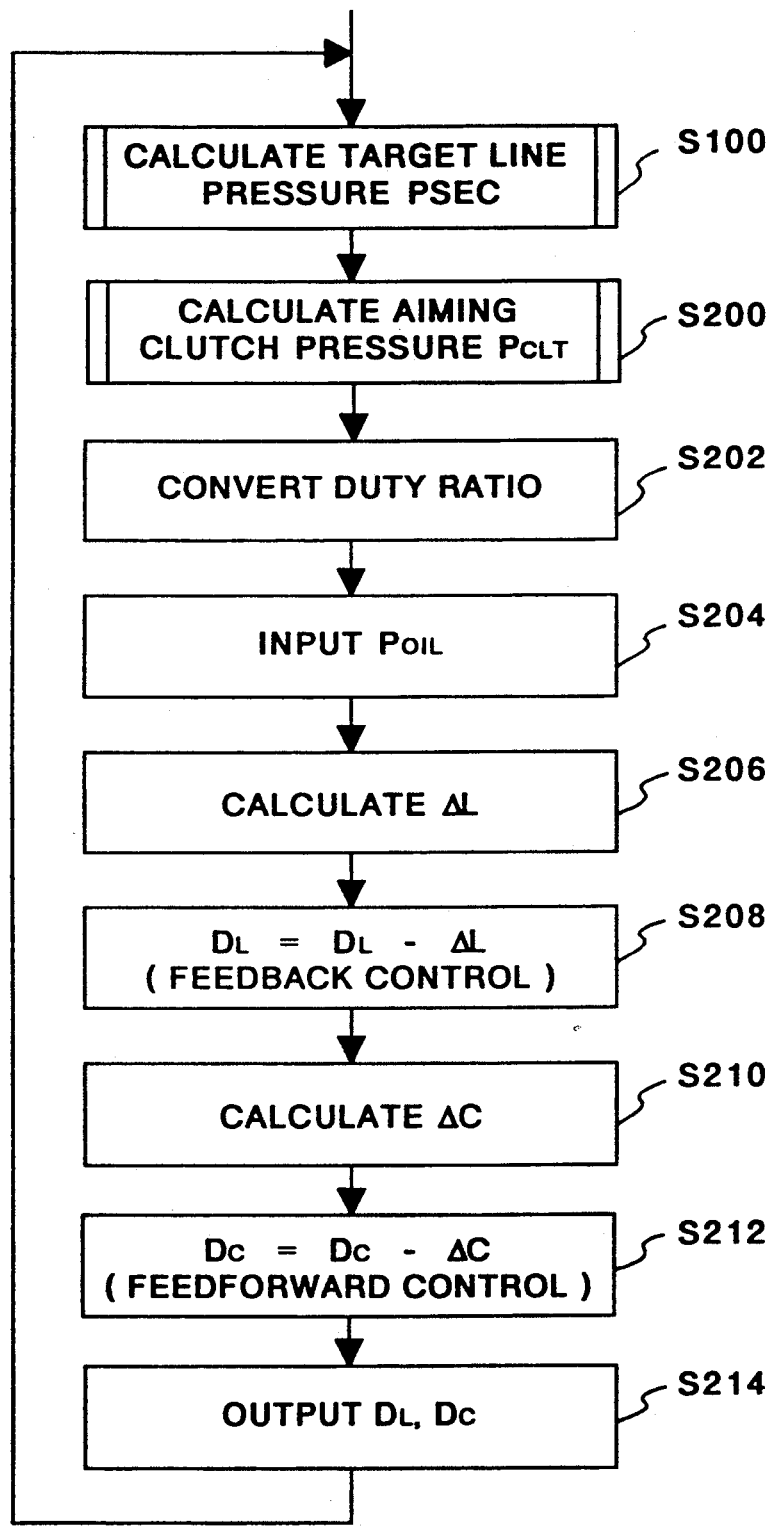
FIG. 10 is a flow chart which illustrates the overall control procedure according to the embodiment of the present invention.

FIG. 10 is a flow chart which illustrates the overall procedure of the control. In step S100, target value PSEC of the line pressure at the line 101 to be supplied to the secondary chamber is calculated. As for details of this calculation, see FIG. 12. In step S200, target value $P_{CLT}$ of the clutch pressure at which the pressure supplied to the forward/reverse clutch chamber is restored to the original pressure is calculated. The target value $P_{CLT}$ of the clutch pressure is determined in accordance with the torque to be supplied via the torque converter and is determined to be the value which corresponds to TQTRBN (step S122) of a line pressure control procedure (see FIG. 12) to be described later. In step S202, PSEC and PCLT are respectively converted into target duty ratios $D_L$ and $D_C$ in consideration of oil temperature THO or the like in accordance with, for example, the characteristics shown in FIG. 12. In step S204, oil temperature $P_{OIL}$ necessary to perform the feedback control is read from the sensor 89. In step S206, control quantity $\Delta L$ in the feedback control with respect to duty value $D_L$ is calculated from the difference between target value PSEC and $P_{OIL}$ as follows:

$$\Delta L = K \cdot (PSEC - P_{OIL})$$

In step S208, $D_L$ is corrected in accordance with the following equation:

$$D_L = D_L - \Delta L$$

Figure 13A:
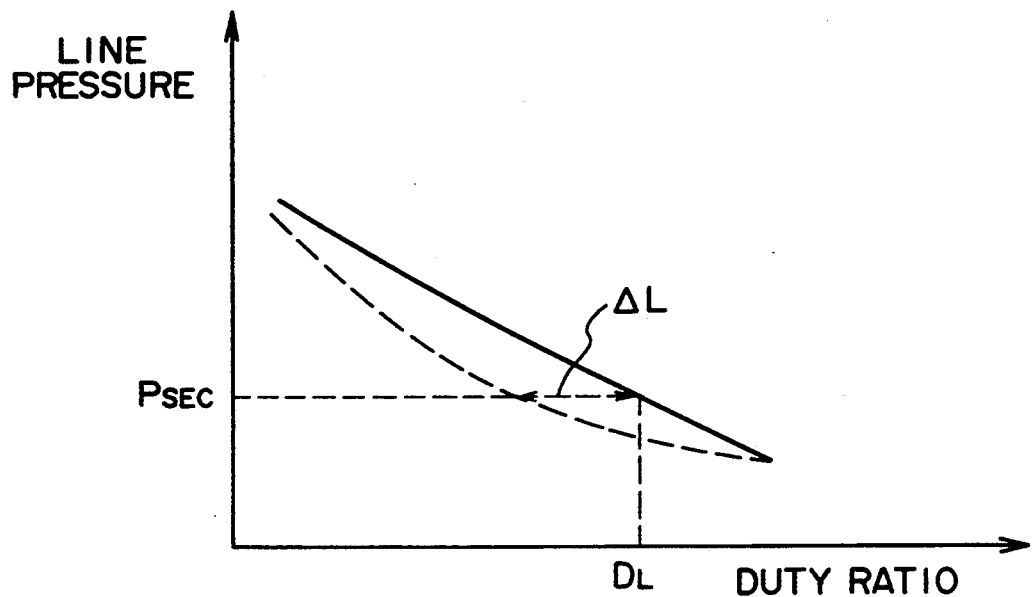
FIGS. 13A and 13B are graphs which illustrate the correspondence between a feedback control and a forward control.
Figure 13B:
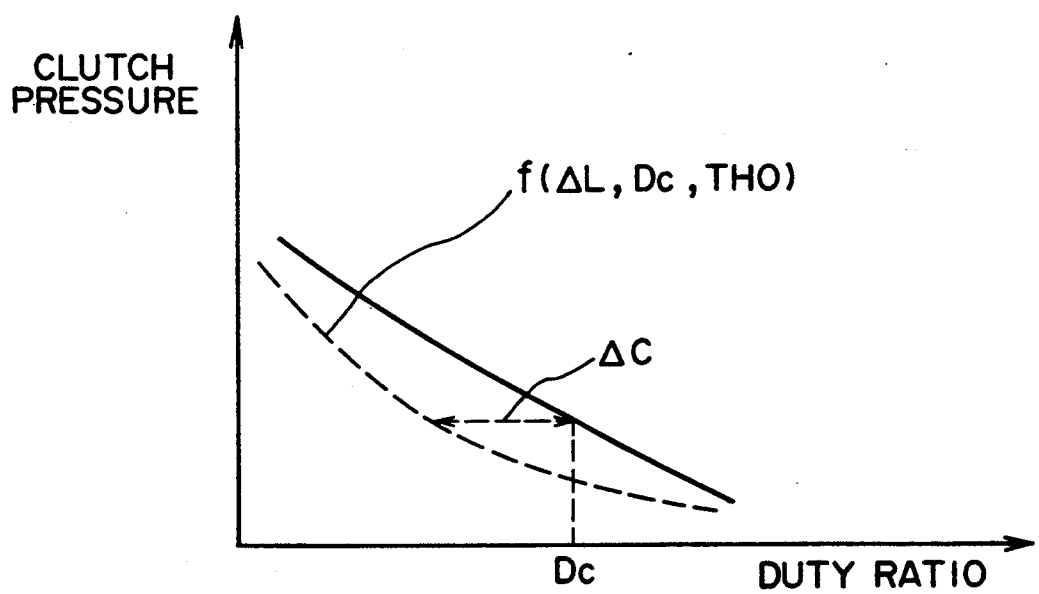

In step S210, correction quantity $\Delta c$ with respect to duty $D_C$ of the clutch pressure is calculated from the map shown in FIG. 13B and in accordance with feedback control quantity $\Delta_L$ for the line pressure and target clutch pressure $P_{CLT}$ before the flow advances to step S212 in which the duty value which corresponds to the final clutch pressure is calculated in accordance with the following equation:

$$D_C = D_C - \Delta c$$

In step S214, thus obtained duty values $D_L$ and $D_C$ are respectively transmitted to the solenoids 51 and 53.

Calculation of PSEC

Prior to the description of the meaning of the control shown in steps S204 through S212, the procedure of the calculations for obtaining target line pressure PSEC performed in step S100 will be described referring to FIG. 12.

Figure 12:
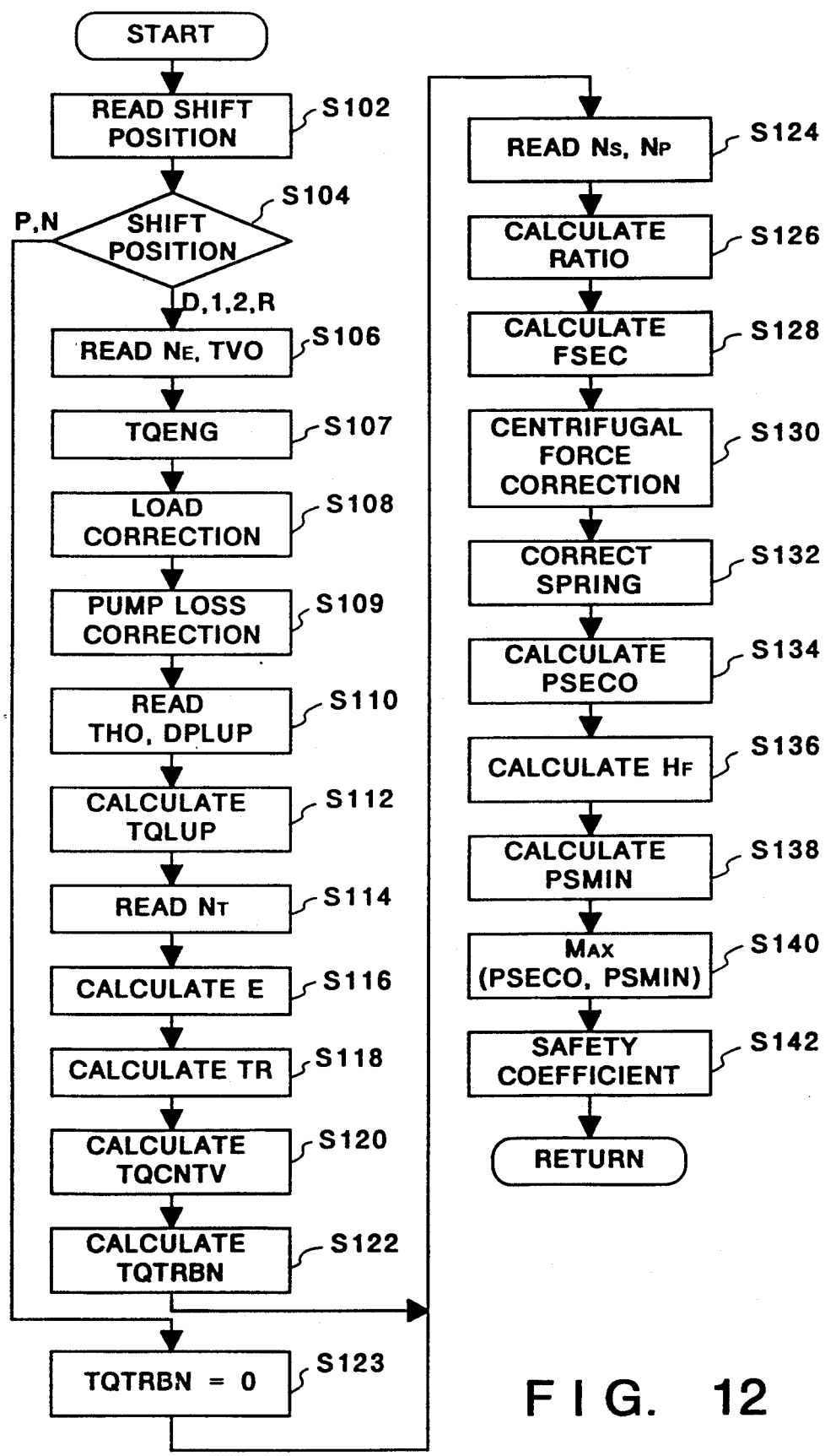
FIG. 12 is a flow chart which illustrates a line pressure control in detail.

Referring to FIG. 12, shift position signal RANGE is read from the sensor 82 in step S102. In step S104, when it is decided that the shift position is at P or N, the transmission is not operated. Therefore, turbine torque TQTRBN is, in step S123, made to be "0" before the flow advances to step S124.

When the shift position is at any of D, 1, 2, or R, the flow advances to step S106 in which engine revolution $N_E$ and throttle opening degree TVO are read from the corresponding sensors 86 and 85. In step S107, engine torque TQENG is calculated in accordance with $N_E$ and TVO and the like and by a manner shown in FIG. 7A (a). In step S108, the load is corrected in accordance with the procedure shown in FIG. 7A (b) before the torque loss in the oil pump is corrected in step S109. As a result, engine output torque TQPUMP is obtained.

In step S110, oil temperature THO is read from the sensor 88, and initial value DPINT of the differential pressure of the lockup clutch is calculated in accordance with TQPUMP and by a procedure shown in FIG. 7B (a). In accordance with initial value DPINT, differential pressure DPLUP is calculated in the control in which the primary side duty is calculated as described above. Then, lockup clutch transmission ratio $H_{LU}$ is calculated from DPLUP in accordance with the procedure shown in FIG. 7B (b). In step S212, lockup clutch transmission torque TQLUP is calculated in accordance with thus obtained DPLUP and HLU, that is, the same is calculated as follows:

$$TQLUP = DPLUP \cdot H_{LU}$$

In step S114, turbine revolution $N_T$ of the torque converter is read from the sensor 87. In step S116, speed ratio E is obtained from the following equation:

$$E = N_t / N_E$$

where symbol $N_T$ is equivalent to $N_P$ (or $N_P \times$ KLRRT) shown in FIG. 7B (e). In step S118, torque ratio TR is calculated as described with reference to FIGS. 7B (d) and 7B (e). Then, in step S120, converter transmission torque TQCNVT is calculated, that is, the same is calculated as follows:

$$TQCNVT = (TGPUM - PTQLU) \cdot TR$$

Then, in step S122, composite torque TQTRBN of the transmission torque TQLUP via the lockup clutch and transmission torque TQCNVT via the converter are calculated, that is, $$TQTRBN = TQLUP + TQCNVT$$

The thus composite torque TQTRBN is subjected to the planetary reduction ratio correction so as to make the result to be TQIN.

In step S124, secondary pulley revolution $N_S$ and primary pulley revolution $N_P$ are read from sensors 84 and 83. In step S126, change ratio RATIO ($= N_P/N_S$) is calculated. In step S128, force FSEC necessary to abut the pulley is calculated from TQIN and RATIO as described with reference to FIG. 7C (a). In steps S130 and S132, the centrifugal correction and the spring correction are performed in accordance with the procedure shown in FIGS. 7C (c) and 7C (d) so that line pressure PSECO is obtained in step S134 PSECO being the piston pressure on the secondary pulley side.

Since PSECO is sometimes reduced below the minimum line pressure due to the centrifugal correction, lowest line pressure PSMIN which corresponds to the current change ratio or like is calculated in accordance with the following procedure. That is, in step S316, pulley abutting force ratio $H_F$ is calculated in accordance with Equation (3). Then, in step S138, lowest line pressure PSMIN necessary for the gear change is calculated in accordance with Equation (4). In step S140, PSECO or PSMIN which is relatively larger is then selected. In step S142, the correction with safety factor $K_{SF}$ is corrected in accordance with a procedure shown in FIG. 7C (h).

The thus selected PSECO or PSMIN which has been determined to be relatively larger becomes target line pressure PSEC in step S100. The thus obtained PSEC is converted into duty ratio $D_L$ in step S202 before it is subjected to the feedback control in accordance with actual line pressure $P_{OIL}$ in steps S205 through step S208 as described above.

FIG. 13A illustrate a status in which duty ratio DL which corresponds to target line pressure PSEC is corrected by $\Delta_L$ in the feedback control. The quantity $\Delta_L$ is automatically determined when the conduit resistance and the characteristics of the solenoid 51 which controls the line pressure adjustment valve 41 have been determined. Also the clutch pressure control performed at the clutch valve 46 is performed on the basis of the line pressure adjustment valve 41. That is, line pressure PSEC and clutch pressure $P_{CLT}$ are closely related to each other and their relationship are previously known. Namely, $\Delta_C$ closely relates to $\Delta_L$.

FIG. 13B illustrates a status $\Delta_C$ that is obtained in accordance with feedback control quantity $\Delta_L$, target clutch pressure $P_{CLT}$ and oil temperature THO. Referring to FIG. 13B, a dashed line for obtaining $\Delta_C$ is the function of feedback control quantity $\Delta_L$, target clutch pressure $P_{CLT}$ and oil temperature THO. Thus, the clutch pressure is subjected to the precise feedback control at substantially the same accuracy realized in the feedback control performed in accordance with the sensor 89 which measures the line pressure supplied to the secondary chamber. That is, the number of hydraulic pressure sensors can be reduced to one.

EFFECT OF THE EMBODIMENT

As will be understood from the foregoing description, in the hydraulic control apparatus of this embodiment, (1): The line pressure supplied to the secondary chamber is feedback controlled with a high degree of accuracy on the basis of the sensor 89. The clutch pressure is feedforward controlled using the control variables $\Delta_L$ and target clutch pressure $P_{CLT}$ of the feedback control performed on line pressure. That is, the line pressure and clutch pressure are controlled with a high degree of accuracy using the single hydraulic sensor.

(2): The control variables in the valves 41 and 46, e.g., $D_L$, $D_C$, $\Delta_C$, are in advance set in accordance with the oil temperature THO, because the oil temperature greatly affects the viscosity of the oil. Generally, the characteristics of the duty solenoid are greatly affected by the oil temperature. Therefore, detection of the temperature of the oil which flows through the duty solenoids is desirable. However, it is difficult to provide a temperature sensor in each duty solenoid. In the above embodiment, feedback control is used for the hydraulic control of the secondary chamber, and feedforward control is used for the hydraulic control of the clutch chamber, as stated above. If feedback control is designed to be applied for hydraulic control of the clutch chamber, the feedback controls performed for the secondary chamber and clutch chamber will have the same tendency. Hence, in this embodiment, oil temperature correction (FIG. 7B) is conducted when PSEC is operated, and the results thereof are reflected on PSEC (step S100). Control signal $D_L$ of the duty solenoid 51 for the secondary chamber 37 is operated on the basis of the feedback control (steps S206 and S208). Thereafter, in steps S210 and S212, feedforward control is performed on the hydraulic pressure of the clutch chamber on the basis of $D_L$. That is, oil temperature correction taken into consideration in the feedback control is reflected in the feedforward control of the oil pressure of the clutch chamber. In other words, the oil pressure of the clutch chamber is controlled with a high degree of accuracy.

MODIFICATION

Various modifications may be made in the invention without departing from the scope of the claims.

In the above embodiment, the hydraulic circuit for the stepless transmission has been described. However, the present invention can also be applied to any transmission having a hydraulic circuit.

In the above-described embodiment, the line pressure adjusting valve 41 and the clutch valve 46 have been discussed as the pressure controlling valve. However, any other type of pressure controlling valve can also be used.

In the control shown in FIG. 11, feedback control is performed on the duty value. However, feedback control may be performed on the pressure value, duty conversion being conducted thereafter.

The present invention is not limited to the above embodiments and various changes and modifications can be made within the spirit and scope of the present invention. Therefore, to apprise the public of the scope of the present invention the following claims are made.

What is claimed is:

1. A hydraulic control apparatus for transmission having at least two hydraulic pressure controlling valves for adjusting the hydraulic pressure, comprising:
    a hydraulic sensor means for monitoring a hydraulic pressure;
    a feedback control means for feedback controlling the pressure of a first hydraulic pressure controlling valve on the basis of an output of said sensor means; and
    a feedforward control means for feedforward controlling the pressure of a second hydraulic pressure controlling valve other than said first hydraulic pressure controlling valve on the basis of the results of the feedback control.

2. A hydraulic control apparatus according to claim 1, wherein said feedback control means outputs a first control variable $\Delta L$ to said feedforward control means, and wherein said feedforward control means performs a feedforward control on the second pressure controlling valve on the basis of the first control variable $\Delta L$ and a second control variable $P_{CLT}$ which is in advance set for the second pressure controlling valve.

3. A hydraulic control apparatus according to claim 2, wherein said feedback control means has a detection means for detecting a hydraulic temperature, and sets the first control variable on the basis of the detected hydraulic temperature.

4. A hydraulic control apparatus according to claim 1, wherein said transmission is a belt type stepless transmission including a hydraulically actuated clutch mechanism for transmitting a rotation of an engine in forward and reverse directions, and a belt power transmission mechanism having primary and secondary pulleys whose diameters are controlled using hydraulic pressure, and wherein the first hydraulic pressure controlling valve controls a line pressure for said secondary pulley, and the second hydraulic pressure controlling valve controls a hydraulic pressure for said clutch mechanism.

5. A hydraulic control apparatus according to claim 1, wherein hydraulic inputs to the first and second hydraulic pressure controlling valves are supplied from a common source.

6. A hydraulic control apparatus according to claim 4, wherein said feedback control means has a detection means for detecting a hydraulic temperature, and calculates the first control variable ($\Delta L$) on the basis of a hydraulic pressure $P_{OIL}$ detected by said hydraulic sensor means, a hydraulic temperature (THO) detected by said detection means, and a target value (PSEC) of the pressure for said secondary pulley, and wherein said feedforward control means calculates the second control variable ($\Delta C$) on the basis of a target value $P_{CLT}$ for the clutch mechanism and the first control variable ($\Delta L$).

* * * * *